(12) United States Patent
Sakamoto et al.

(10) Patent No.: US 6,996,803 B2
(45) Date of Patent: *Feb. 7, 2006

(54) PROGRAM GENERATION METHOD

(75) Inventors: Kazuhiko Sakamoto, Kawasaki (JP);
Tetsuya Masuishi, Machida (JP);
Takashi Okoda, Ebina (JP)

(73) Assignee: Hitachi, Ltd., Tokyo (JP)

( * ) Notice: Subject to any disclaimer, the term of this patent is extended or adjusted under 35 U.S.C. 154(b) by 613 days.

This patent is subject to a terminal disclaimer.

(21) Appl. No.: 09/955,021

(22) Filed: Sep. 19, 2001

(65) Prior Publication Data

US 2002/0087946 A1    Jul. 4, 2002

Related U.S. Application Data

(63) Continuation of application No. 09/548,597, filed on Apr. 13, 2000, now Pat. No. 6,330,713, which is a continuation of application No. 09/114,622, filed on Jul. 13, 1998, now Pat. No. 6,117,184, which is a continuation of application No. 08/554,632, filed on Nov. 6, 1995, now Pat. No. 5,815,711.

(30) Foreign Application Priority Data

Nov. 15, 1994   (JP)   .................... 06-280235

(51) Int. Cl.
*G06F 9/44* (2006.01)
(52) U.S. Cl. ............ 717/109; 717/106; 717/110; 717/113; 715/826; 715/967
(58) Field of Classification Search ........ 717/106–109, 717/140–143, 110, 113, 145; 345/866, 763; 710/22; 715/826, 866, 967; 711/208

See application file for complete search history.

(56) References Cited

U.S. PATENT DOCUMENTS 4,620,279 A   *  10/1986   Read et al. ............... 710/22

(Continued)

FOREIGN PATENT DOCUMENTS

JP           06-274333           9/1994

OTHER PUBLICATIONS

Namioka et al., Planning method used in visual programming for sequence-control program design with sequential function chart, IEEE, vol. 44, Issue 3, Jun. 1997 Page(s): 279-288.*

(Continued)

*Primary Examiner*—Tuan Dam
*Assistant Examiner*—Satish S. Rampuria
(74) *Attorney, Agent, or Firm*—Mattingly, Stanger, Malur & Brundidge, P.C.

(57) ABSTRACT

A program is generated by combining program modules by displaying programs for guiding the combination of program modules and selecting one of the programs. Program modules stored in a memory are displayed on a display device by a command inputted from the input device, navigation programs for guiding the combination of program modules stored in the memory are retrieved by a command inputted from the input device, the retrieved navigation program group are displayed on the display device, a desired navigation program is selected from the navigation program group displayed on the display device, the navigation program is executed, a guide parameter outputted by the navigation program for the combination of program modules is designated, a connector module for combining program modules is generated from the guide parameter inputted from the input device, and the generated connector module is stored in the memory.

13 Claims, 21 Drawing Sheets

U.S. PATENT DOCUMENTS

| | | | | |
|---|---|---|---|---|
| 4,860,204 A | | 8/1989 | Gendron et al. | |
| 5,159,687 A | * | 10/1992 | Richburg | 717/106 |
| 5,163,130 A | * | 11/1992 | Hullot | 345/763 |
| 5,182,806 A | * | 1/1993 | McKeeman et al. | 717/145 |
| 5,235,679 A | | 8/1993 | Yoshizawa et al. | |
| 5,267,145 A | * | 11/1993 | Zifferer et al. | 700/86 |
| 5,315,710 A | | 5/1994 | Kishimoto et al. | |
| 5,325,533 A | * | 6/1994 | McInerney et al. | 717/107 |
| 5,333,084 A | * | 7/1994 | Galloway et al. | 360/77.07 |
| 5,481,688 A | * | 1/1996 | Takagi | 711/208 |
| 5,485,615 A | * | 1/1996 | Wennmyr | 717/109 |
| 5,488,714 A | * | 1/1996 | Skidmore | 717/143 |
| 5,522,024 A | * | 5/1996 | Hiraga et al. | 345/866 |
| 5,524,246 A | | 6/1996 | Hurley et al. | |
| 5,700,427 A | * | 12/1997 | Ghaed et al. | 422/52 |
| 5,815,711 A | | 9/1998 | Sakamoto et al. | |
| 6,117,184 A | * | 9/2000 | Sakamoto et al. | 717/109 |
| 6,330,713 B1 | * | 12/2001 | Sakamoto et al. | 717/109 |
| 6,880,086 B2 | * | 4/2005 | Kidder et al. | 713/191 |
| 2004/0015833 A1 | * | 1/2004 | Dellarocas et al. | 717/106 |

OTHER PUBLICATIONS

Liu et al., An FSM-based program generator for communication protocol software, IEEE, Nov. 9-11, 1994 Page(s): 181-187.*

Wong et al., An automatic software generation approach for easier distributed programming, IEEE, vol. 2, Oct. 14-17, 1996 Page(s):1553-1558.*

Sloane, Generating dynamic program analysis tools, IEEE, Sep. 29-Oct. 2, 1997 Page(s):166-173.*

"VB 3.0 Prof. Ed Programmer's Guide", Microsoft Corp., pp. 1-6.

Johnson et al, "ACE: Building Interactive Graphical Applications", Comm. of the ACM, Apr. 1993, pp. 41-55.
Morris et al, "C++ IDEs Evolve", InfoWorld, Apr. 1994, pp. 70-78.

Udell, "Component", BYTE, May 1994, pp. 46-56.

Del Rossi et al, "Component-Based Development", InfoWorld, Apr. 1993, pp. 69-70.

Ogimoto, K. et al, "Program Synthesis System", Information Processing Society of Japan, 91-SE-77, Feb. 1991, pp. 69-74.

* cited by examiner

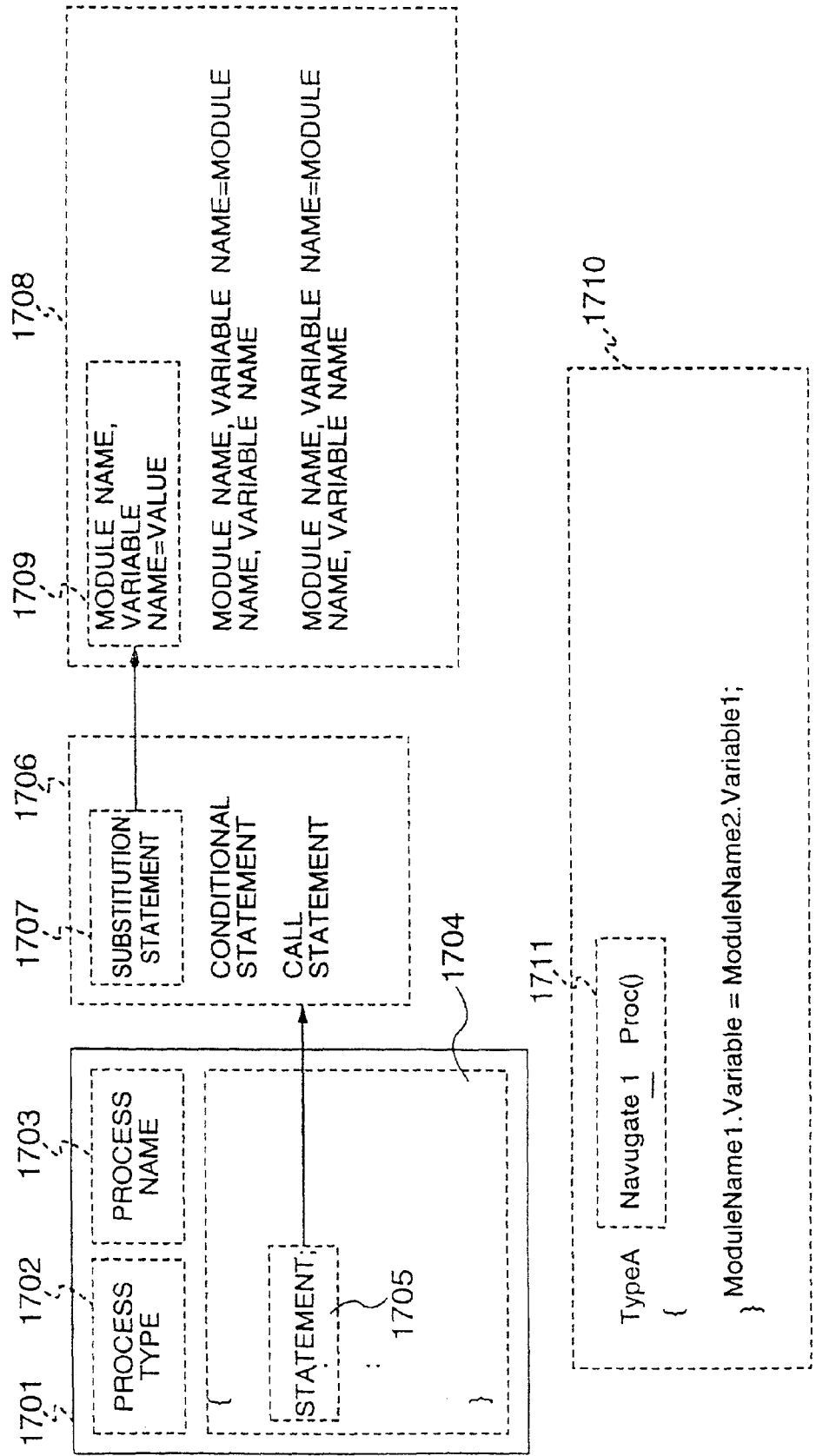

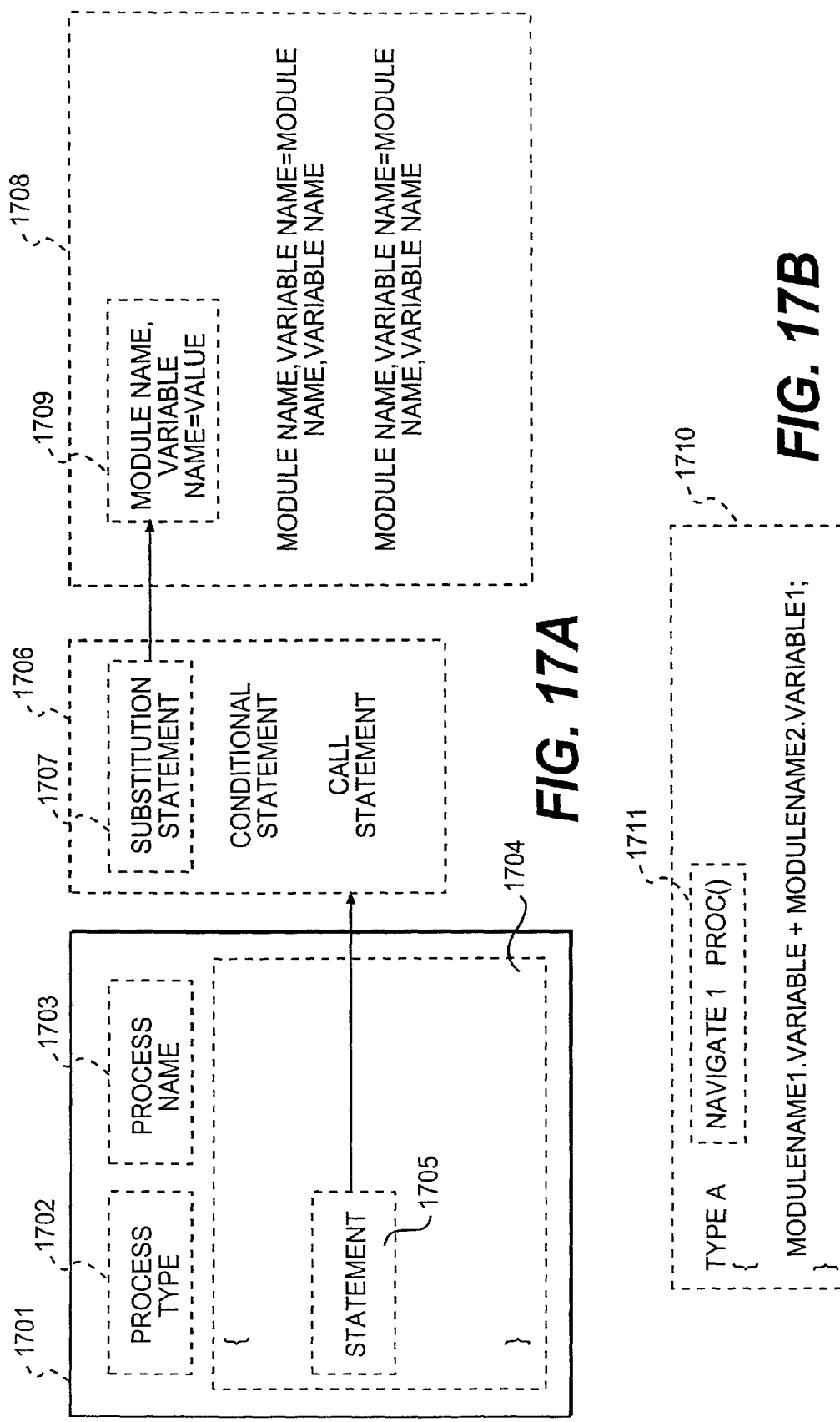

PROGRAM GENERATION METHOD

CROSS-REFERENCES TO RELATED APPLICATIONS

This is a continuation of U.S. application Ser. No. 09/548,597, filed on Apr. 13, 2000, now U.S. Pat. No. 6,330,713, which is a continuation of U.S. application Ser. No. 09/114,622, filed on Jul. 13, 1998, now U.S. Pat. No. 6,117,184, which is a continuation of U.S. application Ser. No. 08/554,632, filed on Nov. 6, 1995, now U.S. Pat. No. 5,815,711.

BACKGROUND OF THE INVENTION

The present invention relates to a method for generating a program by combining program modules, and more particularly to a method for generating a connector module by retrieving candidates for a combination of program modules based on a relation between program modules and selecting a retrieved candidate to specify the combination of program module.

A prior art method for generating a program by combining program modules is Visual Basic by Microsoft Inc. The Visual Basic technology described below is based on a programming guide "Microsoft Visual Basic Programming System for Windows" published by Microsoft Inc on May 20, 1993.

The Visual Basic prepares an application in three steps. First, a user interface is designed, next values are set for properties and defined variables, and finally a Basic code id described. More specifically, in designing the user interface, program modules called controls such as a text control having a function to input a text are arranged in a window called a form. In designing the properties, values are set for the external views such as positions and colors of the controls arranged in the form and for the variables which determine operations. A program to be executed when any event occurs for the control arranged in the form is described by the Basic code. For example, when a user clicks a button control by a mouse, a click event corresponding to the button control occurs. A click event procedure corresponding to the click event is described by the Basic code. In the Visual Basic, as described above, the application is prepared by describing it by the basic code for each combination of program module (form and control) and event.

In the prior art, the event procedure of the program module (form and control) arranged in the form must be described by the Basic code when the application is prepared.

SUMMARY OF THE INVENTION

It is an object of the present invention to provide a program generation method for generating a combined program by preparing a process content of event procedures of program modules, arranging the program modules, and combining program modules while displaying the process content of the event procedures and selecting them.

The method for generating a program of the present invention comprises the steps of visually displaying program modules stored in the memory on a display device by a command inputted from the input device, retrieving navigation programs for guiding the combination of program modules stored in the memory by a command inputted from the input device, displaying the retrieved navigation program group on the display device, selecting a desired navigation program from the navigation program group displayed on the display device by a command inputted from the input device, executing the navigation program, designating a guide parameter outputted by the navigation program for the combination of program modules by a command inputted from the input device, generating a connector module for combining program modules from the guide parameter inputted from the input device, and storing the generated connector module in the memory.

In accordance with the present invention, by guiding the combination of the program modules stored in the memory by manipulating the program modules visually displayed on the display device, a navigation program which guides the combination of the program modules stored in the memory is retrieved and displayed on the display device. By selecting a desired navigation program from a group of navigation programs displayed on the display device, the navigation program is executed. The navigation program outputs parameters to guide a combination of program modules and a connect module to allow the combination of program modules is generated by specifying the parameters, and the generated connect module is stored in the memory.

BRIEF DESCRIPTION OF THE DRAWINGS

FIGS. 17A and 17B show a structure of a navigation process.

DETAILED DESCRIPTION OF THE PREFERRED EMBODIMENTS

One embodiment of the present invention is now explained in detail with reference to the accompanying drawings.

Figure 1:
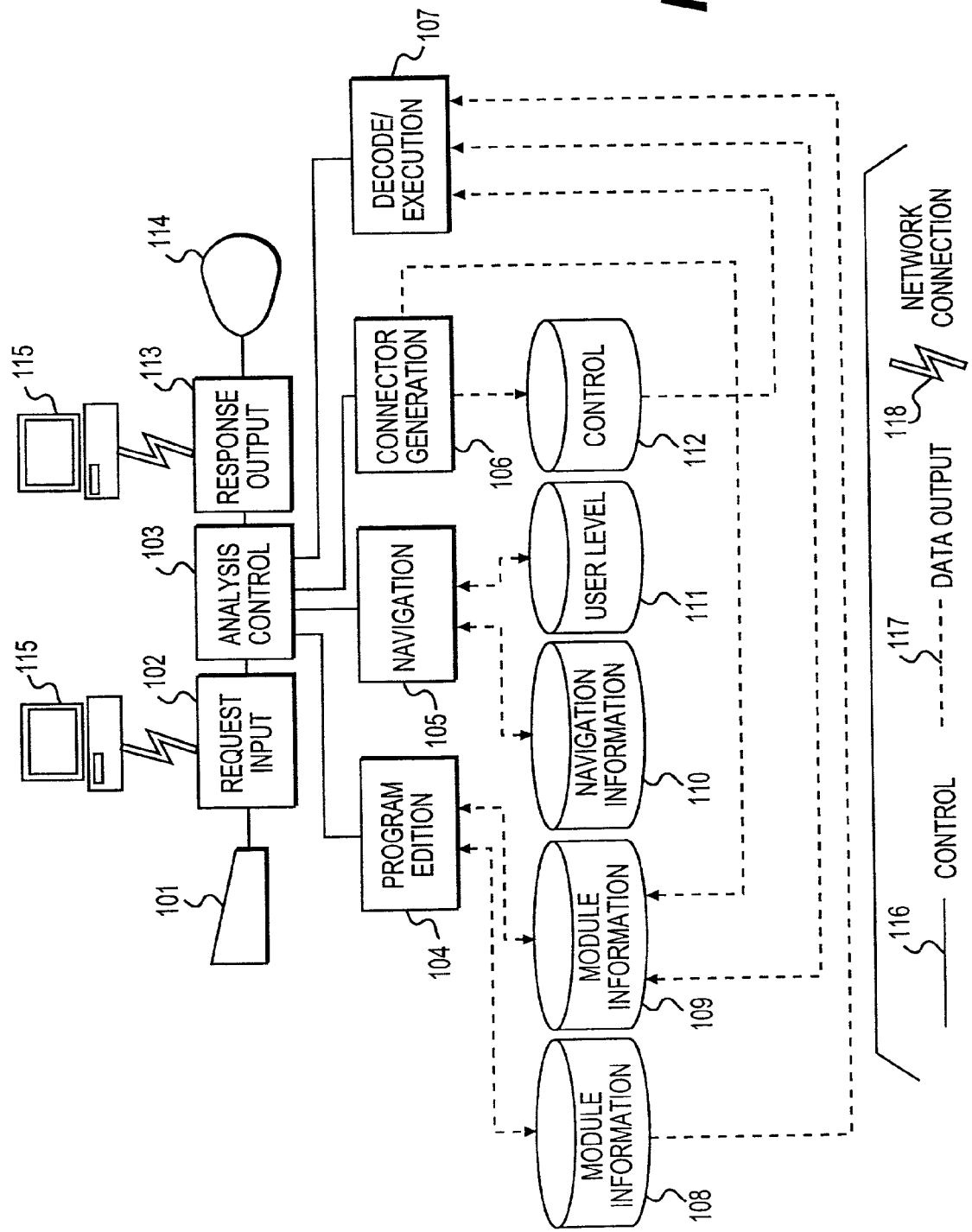
FIG. 1 shows a functional configuration of an embodiment of the present invention.

FIG. 1 shows a functional configuration of a program generation system for implementing the present invention. A solid line 116 shows a control relation between functions of the present system, and a broken line 117 shows a relation of data read/write of the functions. A dual line 118 shows a connecting line of a network. A user request is inputted by a request input 102 through an input device 101 such as a keyboard or a pointing device and a computer 115 connected to the network. An analysis control 103 analyzes a content of the request and depending on a result of analysis, calls a necessary function from program edition 104, navigation 105, connector generation 106 and decode/execution 107, and delivers it to a response output 113. The response output 113 outputs the result to a display device 114 or the computer 115 connected to the network. The program edition 104 reads, writes and edits program information 109 to be edited and module information 108 which will become an elements of the program. The navigation 105 reads navigation information 110 which guides a method for combining modules during the edition and user level 111 for limiting the utilization of the navigation information 110 by a user level to conduct the guidance. The connector generation 106 generates a module for connecting modules based on the guide result, writes the generated module (hereinafter referred to as a connector) to a connector 112 and writes a relation between the combined modules which are source modules and the generated module into program information 110. The decode/execution 107 reads the program information 109, the module information 108 and the connector 112, decodes them and executes the decode control.

Figure 2:
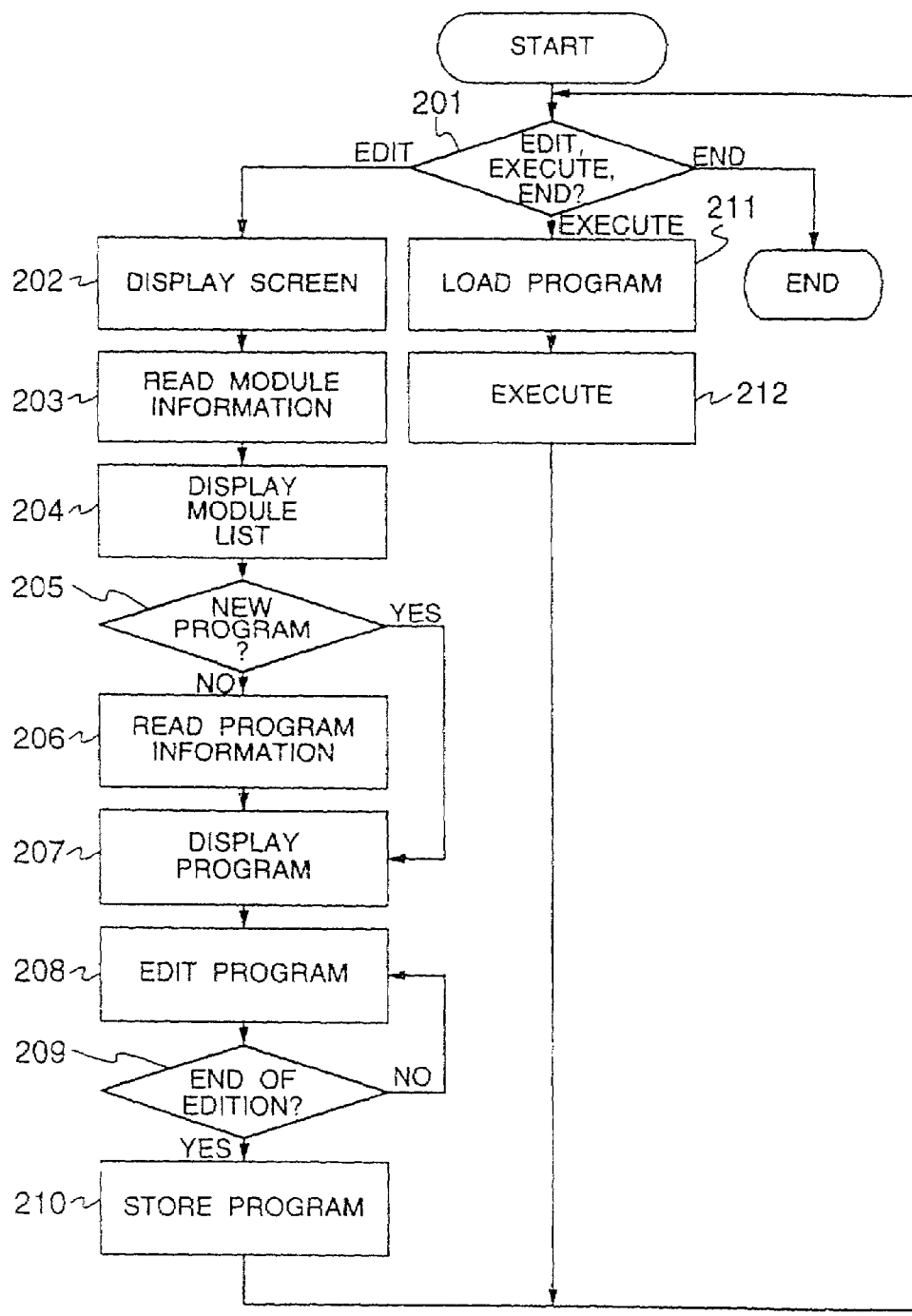
FIG. 2 shows a process flow of the embodiment of the present invention.

FIG. 2 shows a schematic process flow of the present system. A step 201 determines a request inputted by a user to the present system. If the request is edition of a program, a step 202 is executed, if it is execution of a program, a step 211 is executed, and if it is end, the process of the present system is terminated.

Figure 3A:
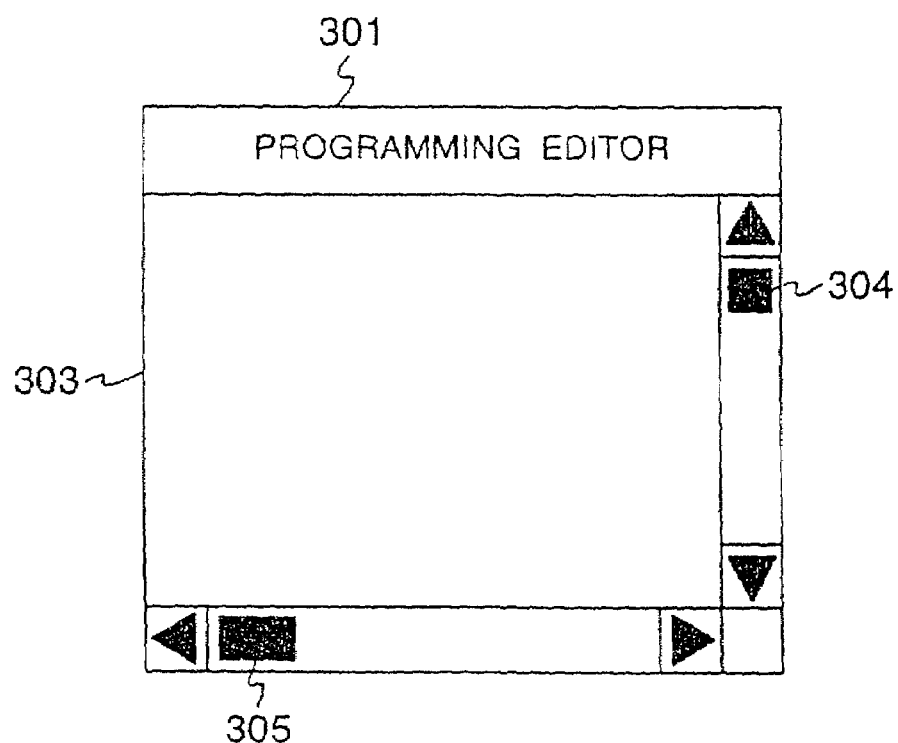
FIGS. 3A and 3B show screen structures in the present invention.
Figure 3B:
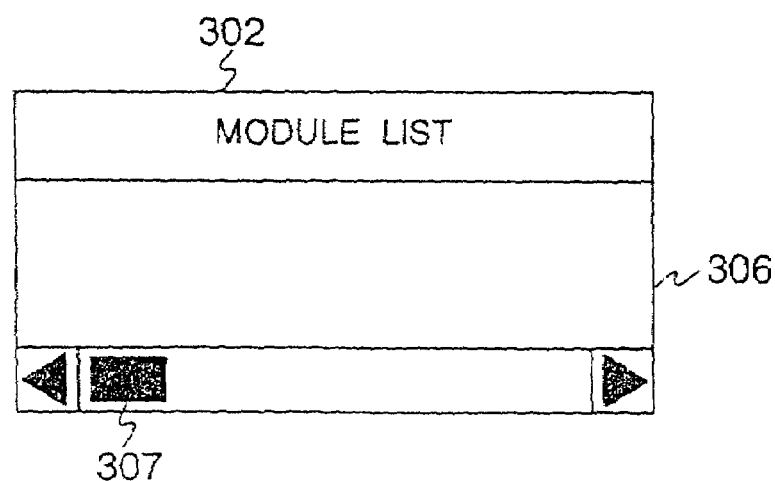

The step 202 displays an initial screen of the present system. FIGS. 3A and 3B show the initial screen of the present system. The screen of the present system comprises two parts. A screen 301 shown in FIG. 3A is a programming editor screen for editing a program, and a screen 302 shown in FIG. 3B is a module list screen for graphically displaying a list of modules constituting the program. The program editor screen 301 comprises a program editor area 303 for displaying and editing a program, a slider 304 for scrolling the program editor area 303 forward and backward, and a slider 305 for scrolling it leftward and rightward. The module list screen 302 comprises a module display area 306 for graphically displaying a module and a slider 307 for scrolling the module leftward and rightward.

The step 203 reads modules constituting the program from the module information 108, develops them into a module information table accessible by the present system and loads it to the memory. A structure of the module information table 108 loaded in the memory is shown in FIG. 4.

Figure 4:
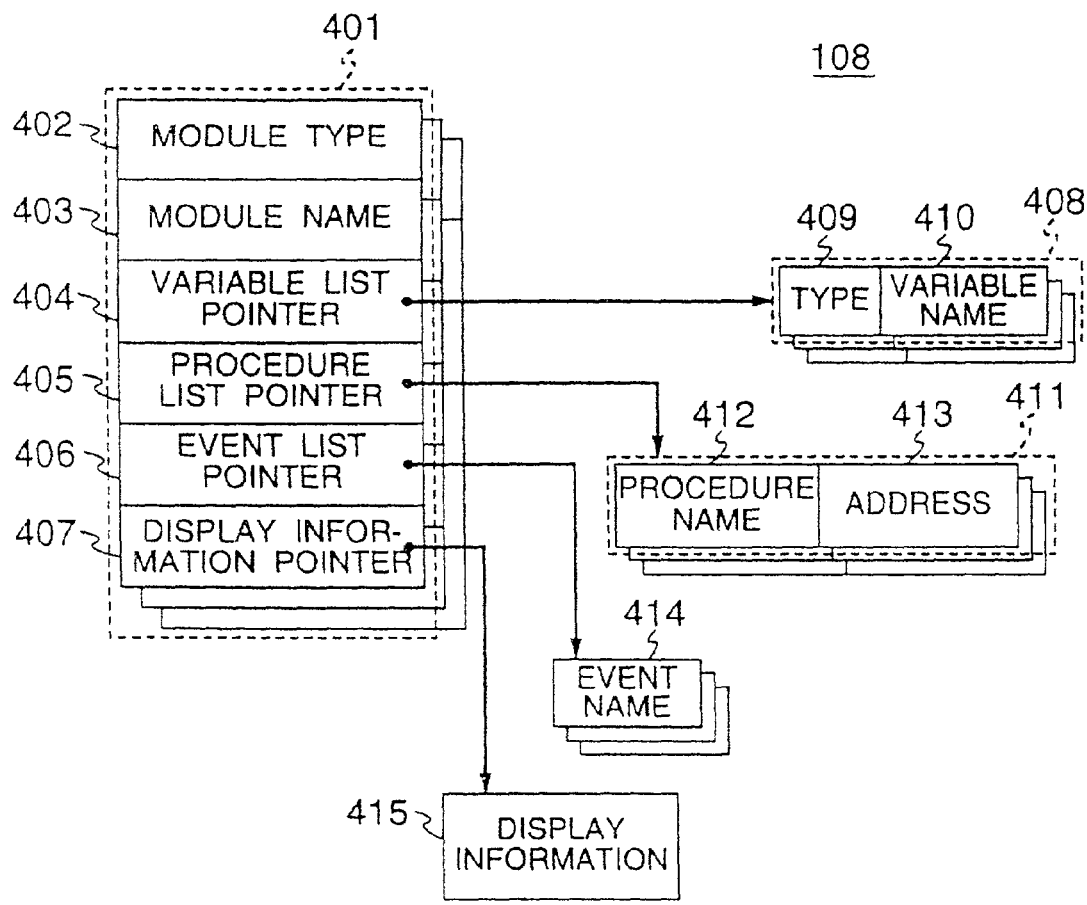
FIG. 4 shows a module information table for managing modules.

A record structure of the module information table 108 is shown in a record 401 of FIG. 4. The record 401 comprises a module type 402 for storing a type of module, a module name 403 for storing a name of module, a variable list pointer 404 for storing a pointer to a list 408 of variables of the module, a procedure list pointer 405 for storing a pointer to a list 411 of procedures of the module, an event list pointer 406 for storing a pointer to a list 414 of events of the module, and a display information pointer 407 for storing a pointer to display information 415 which stores graphics seeds, colors and positions for displaying the module on the program editor screen 301. Each of the records of the variable list 408 pointed by the variable list pointer 404 includes a type 409 for storing a type of variable and a variable name 410 for storing a name of variable. Each of the records of the procedure list 411 pointed by the procedure list pointer 405 includes a procedure name 412 for storing a name of procedure and an address 413 for storing an address of procedure. Each of the records of the event list 414 pointed by the event list pointer 406 includes an event name 414 for storing a name of event.

A step 204 reads modules which will become elements of the program from the module information 108 reads the display information 415 for each of the records 401 of the module information table developed into the memory and displays a graphics representing the modules on the module display area 306 in accordance with the display information 415.

Figure 5:
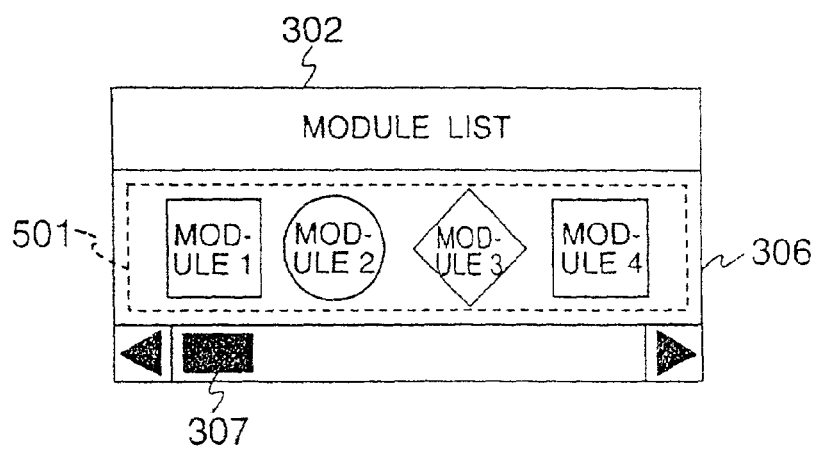
FIG. 5 shows a screen for displaying modules.

FIG. 5 shows an example of display of the graphics representing the modules on the module list screen. Four modules are displayed on the module display area 306 (encircled by a broken line 501). The graphics displayed on the module display area 306 is referred to as a module graphics.

Figure 6:
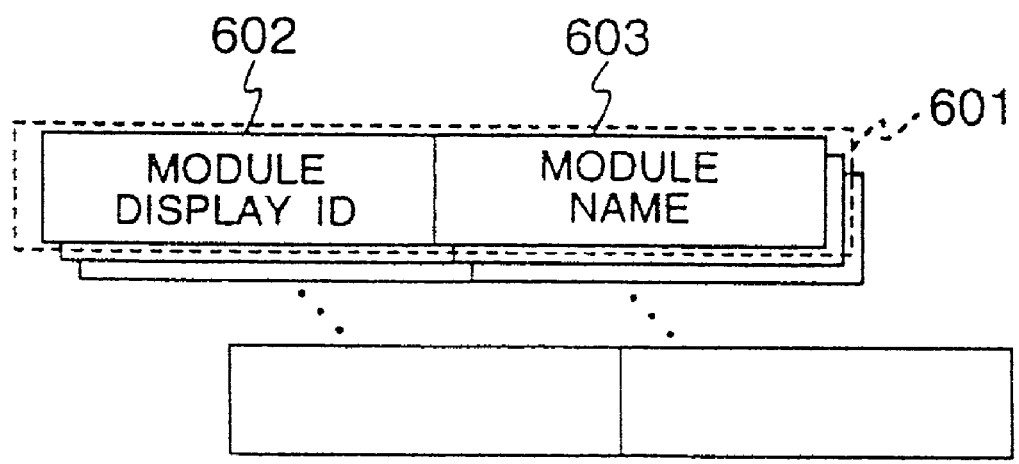
FIG. 6 shows a table for showing modules.

FIG. 6 shows a module list table 601 stored in the memory for displaying the modules on the module list screen 302. Each of the records of the module list display table 601 includes a module display ID 602 for storing an ID of module graphics displayed on the module list screen 302 and a module name 603 for identifying which one of modules stored in the module information table 401 the module graphics displayed on the module list screen 302 displays.

A step 205 determines whether the program to be edited is to be newly generated or an existing program in accordance with the user indication. If it is to be newly generated, a control is shifted to a step 207. If it is the edition of the existing program, a control is shifted to a step 206.

Figure 7:
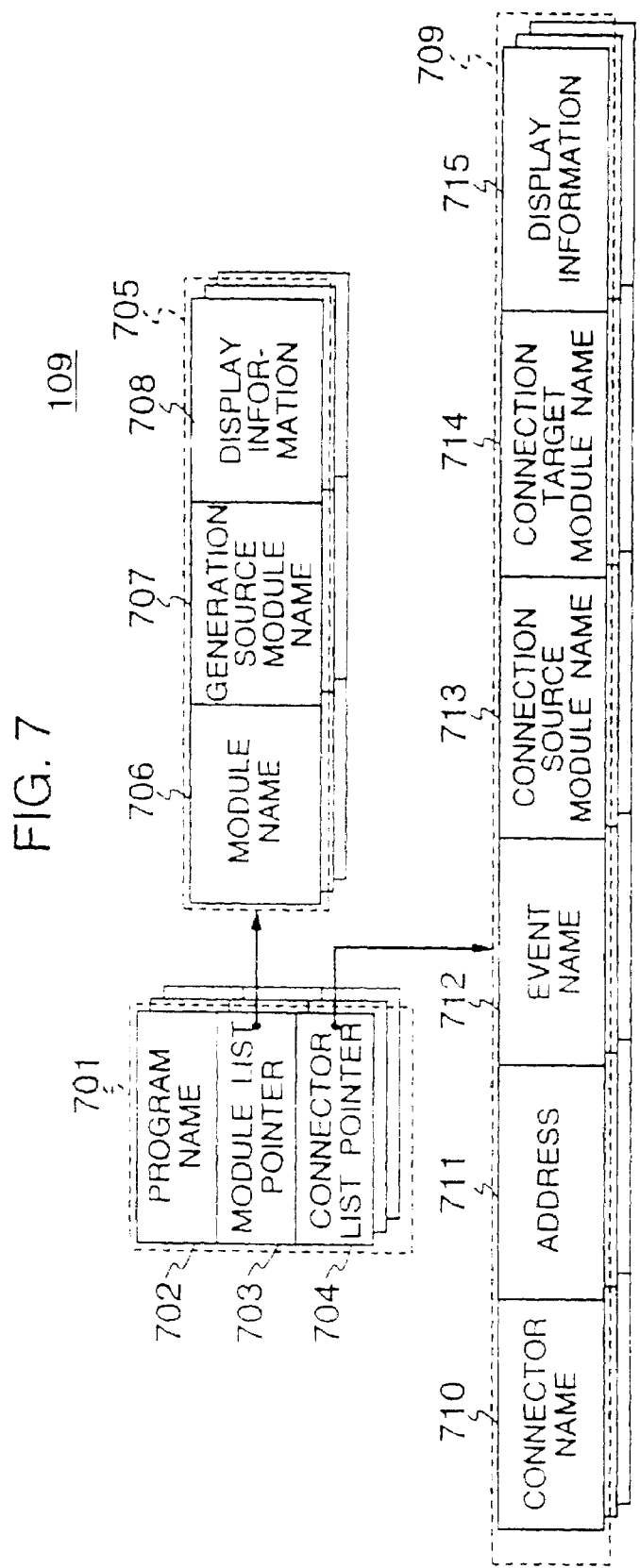
FIG. 7 shows a program information table for managing programs.

A step 206 reads a designated program from the program information 109, develops it into the program information table accessible by the present system and loads it to the memory. A structure of the program information table 109 loaded in the memory is shown in FIG. 7.

Each of the records 701 of the program information table 109 includes a program name 702 for storing a name of program, a module list pointer 703 for storing a pointer of the module list for the program, and a connector list pointer 704 for storing a pointer of the connector list for connecting modules constituting the program. Each of the records 705 pointed by the module list pointer 703 includes a module name 706 for storing a name of module, a source module name 707 for storing a source module stored in the module information table from which the module is generated and display information 708 for storing graphics seeds, colors and positions for displaying the modules constituting the program on the program editor area 303. Each of the records of the connector list 709 pointed by the connector list pointer 704 includes a connector name 710 for storing a name of connector, an address 711 for storing an address of connector, an event name 712 for storing a cause of the execution by the connector, a source module name 713 for storing a source of connection of the connector, a target module name 714 for storing a target of connection of the connector and display information 715 for storing graphics seeds, colors and positions for displaying the connector on the program editor area 303.

Figure 8:
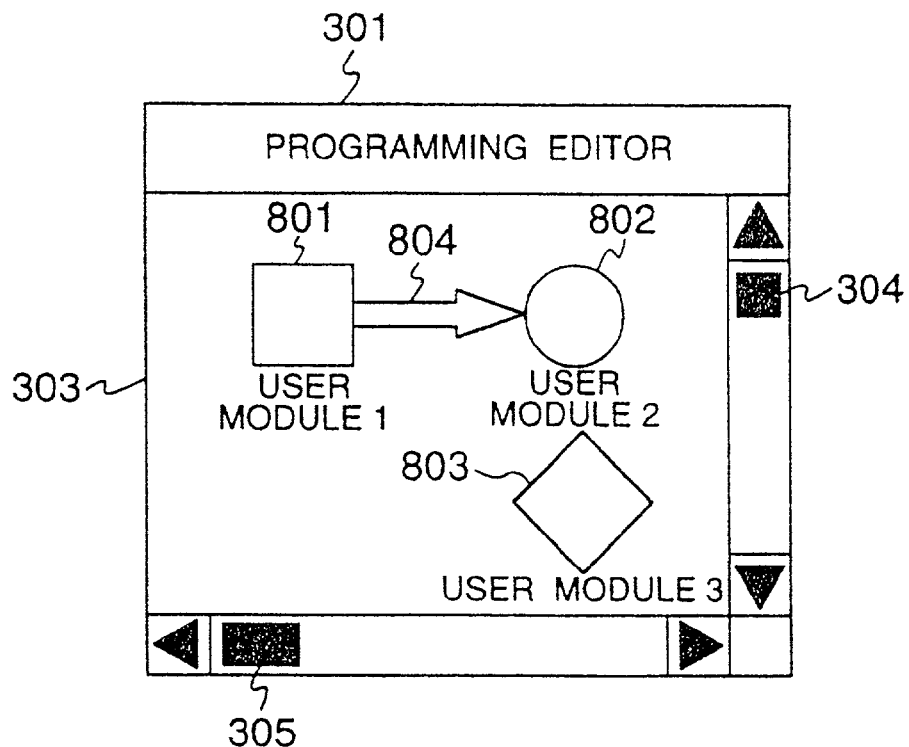
FIG. 8 shows a screen for displaying programs.

A step 207 reads the display information 708 of the modules constituting the program and the display information 715 of the connector for each record 701 of the program information table developed in to the memory by reading the program from the program information 109 in the step 206, and displays them on the program editor area 303 in accordance with the display information 708 and 715. FIG. 8 shows an example of display of the program on the program editor area 303.

Figure 9:
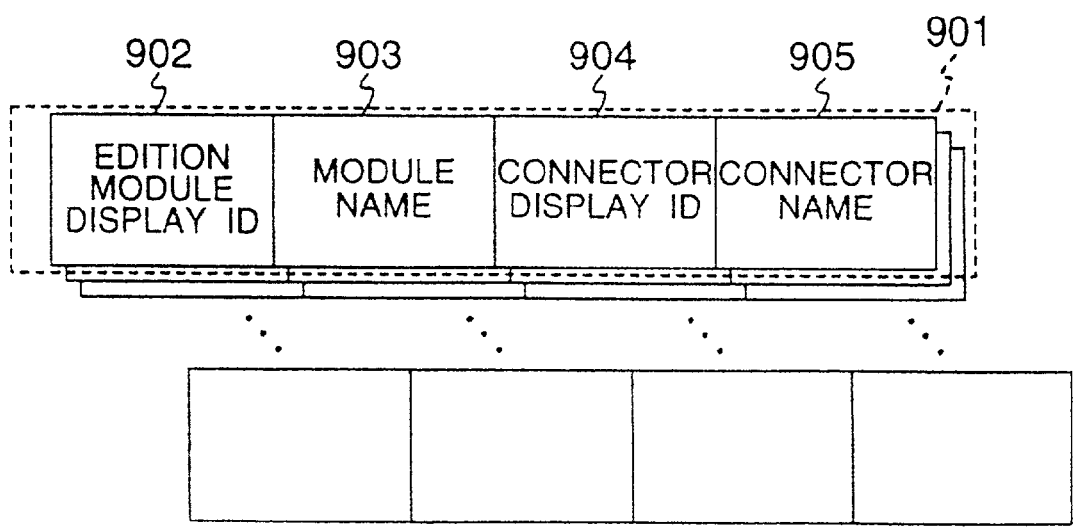
FIG. 9 shows a table for showing programs.

The program editor area 303 displays three modules 801, 802 and 803 and one connector 804. The graphics displayed on the program editor area 303 is referred to as an edition module graphics. FIG. 9 shows a structure of a program display table 901 stored in the memory for displaying the program on the program editor area 303.

Each of the records of the program display table 901 includes an edition module display ID 902 for storing an ID of edition module graphics displayed on the program editor area 303, a module name 903 for identifying a module in the module list pointed by the module list pointer 703 of the program information table 701 which is displayed by the edition module graphics displayed on the program editor module 303, a connector display ID 904 for storing an ID of connector graphics displayed on the program editor area 303, and a connector name 905 for identifying a connector of the connector list pointed by the connector list pointer 704 of the program information table 701 which is displayed by the connector graphics displayed on the program editor area 303.

A step 208 edits the program. The step 208 will be explained in detail in conjunction with FIG. 10.

A step 209 determines the request inputted by the user to the present system. If the request is to end the program edition, a control is shifted to a step 210, and if it is the continuation of the program edition, the control is shifted to a step 208.

A step 210 stores the program edited in the step 208 in the module information 108.

A step 211 loads the program stored in the step 210 for the execution.

A step 212 decodes and executes the program loaded in the memory in the step 211.

Figure 10:
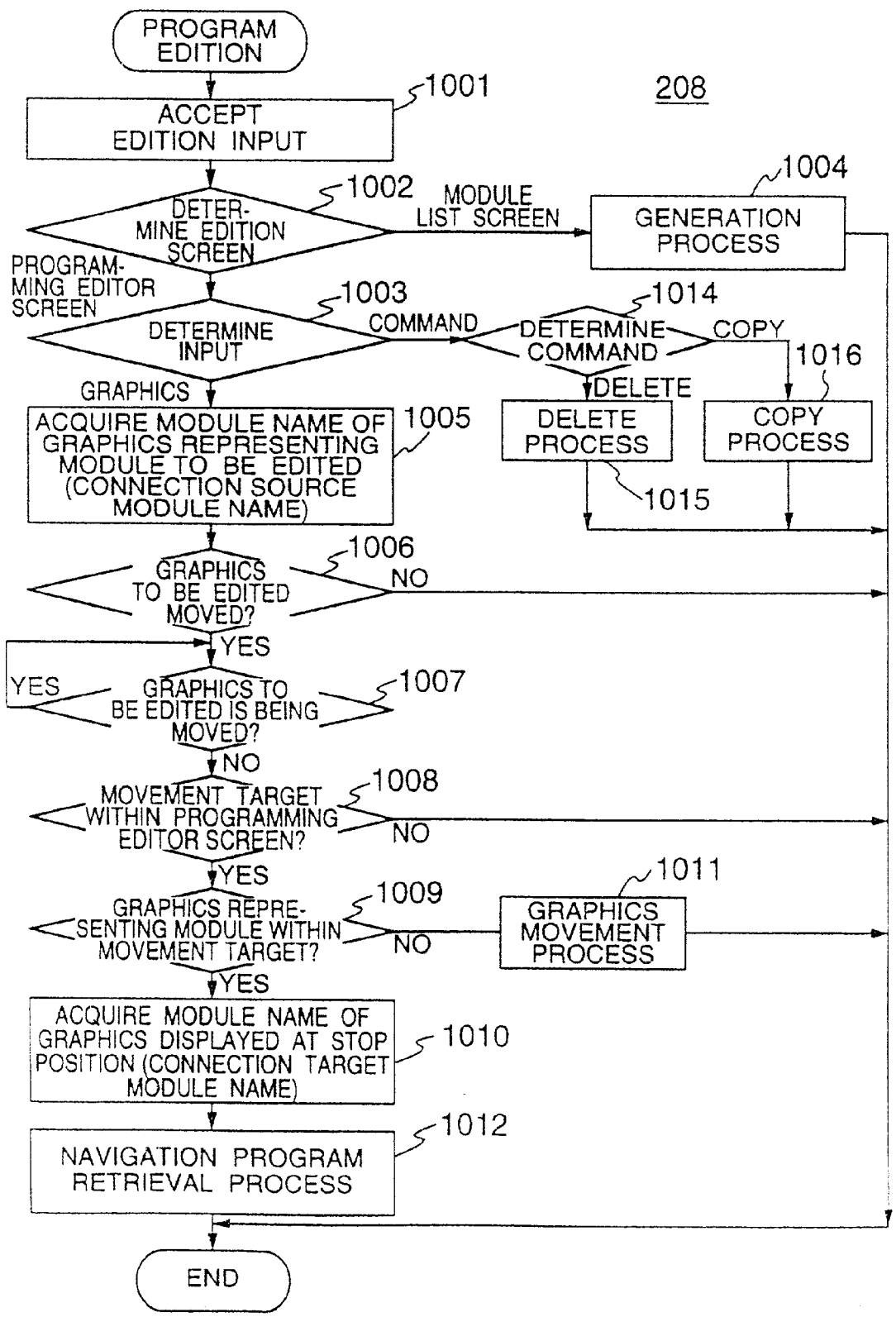
FIG. 10 shows a process flow for editing a program.

The step 208 is explained in detail. FIG. 10 shows a detailed flow chart of the step 208. FIG. 10 shows steps of accepting and decoding the program edit request from the user and allocating the control to the program edit command. The program edit command process includes a generation process, a deletion process, a copy process, a navigation program retrieval process and a graphics move process. The processes are explained below.

Figure 11A:
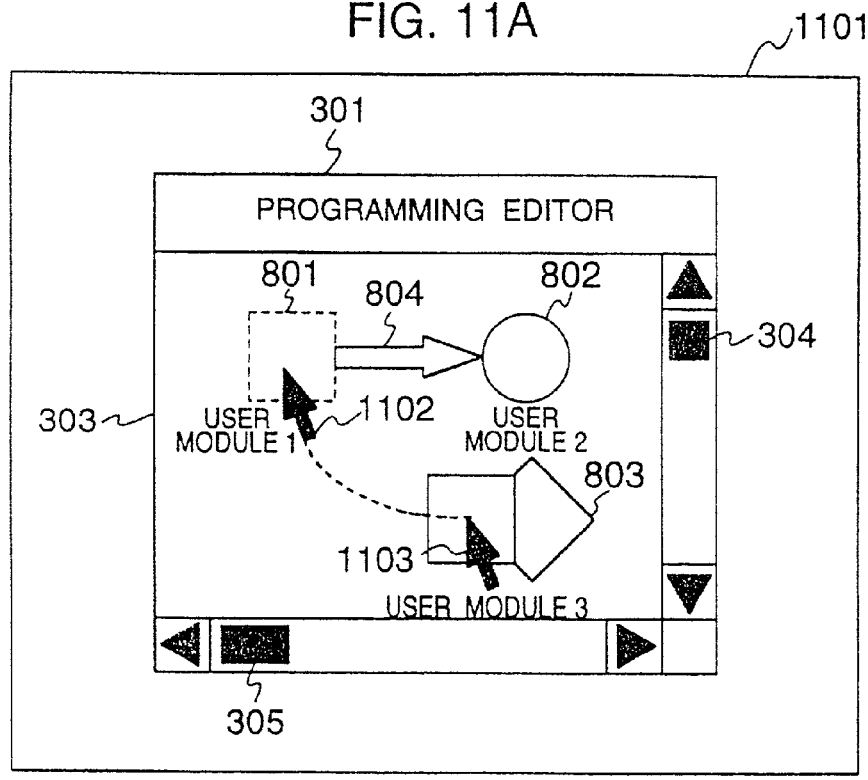
FIGS. 11A and 11B show a programming method of the present invention.

A steps 1001 accepts an input of edit operation for the program editor screen 301 and the module list screen 302. An example of edit operation is shown in FIG. 11A. An example of operation to connect modules is shown in an area 1101. The modules to be connected are a user module 801 and a user module 803 displayed on the program editor area 303. In the connection operation, the source user module 801 is clicked and dragged by a mouse (1102) and superimposed on the target user module 803 (1103). The explanation of FIG. 10 is continued based on the above example of operation.

A step 1002 determines a screen to be edited in accordance with a position of a mouse cursor. If it is an operation to the program editor screen 301, a control is shifted to a step 1003, and if it is an operation to the module list screen 302, the control is shifted to a step 1004. A generation process in the step 1004 will be described later in detail. In the above example of operation, as shown in FIG. 11A, the user module 801 is clicked by the mouse in the program editor area 303. Thus, the control is shifted to the step 1003.

The step 1003 determines an input in accordance with the position of the mouse cursor. If the input is an edition module graphics (hereinafter referred to as a connection source graphics), a control is shifted to a step 1005, and if the input is a command, the control is shifted to a step 1014. In the above example of operation, since the module graphics of the user module 801 is clicked, the control is shifted to the step 1005. Before explaining the step 1005, steps 1014 to 1016 are explained.

A step 1014 determines a type of the command determined in the step 1003. If the command is a delete command, the connection source module graphics is deleted in a step 1015. If the command is a copy command, the connection source module graphics is copied in a step 1016. In the present embodiment, detailed description of the steps 1015 and 1016 is omitted.

The step 1005 acquires a module name from the connection source module graphics. When the module name is acquired, the display ID of the connection source module graphics is compared with the edition module display ID stored in the module display ID 902 of the record 901 of the program display table. The module name stored in the module 903 is acquired from the record 901 of the program display table for which the display ID 902 and the edition module display ID match. The acquired module name is used as the connection source module name.

A step 1006 determines whether the connection source module graphics has been moved or not based on the display coordinate of the module graphics. If it is only the selection and other edition module graphics is selected again, the step 208 is terminated, and if the connection source module graphics has been moved, a control is shifted to a step 1007. In the above example of operation, since the user module 801 was moved in the program editor area 303, the control is shifted to the step 1007.

The step 1007 determines whether the connection source module graphics is being moved or not based on the state of the mouse cursor. If the module graphics is being moved, the step 1007 is repeated. When the movement of the graphics is over, a control is shifted to a step 1008.

The step 1008 determines whether a movement target of the connection source module graphics is within the program editor area 303 or not based on the display coordinate of the module graphics. If the graphics is within the program editor area 303, a control is shifted to a step 1009, and if it is out of the program editor area 303, the step 208 is terminated. In the above example of operation, since the user module 901 was moved in the program editor area 303, the control is shifted to the step 1009.

The step 1009 determines whether other edition module graphics (hereinafter referred to as a connection target module graphics) is displayed on the movement target of the connection source module graphics or not. If the connection target module graphics is not displayed on the movement target, a control is shifted to a step 1010, and if the connection target module graphics is displayed on the movement target, the control is shifted to a step 1010. In the above example of operation, as shown in FIG. 11A, since the user module 801 was superimposed on the user module 803 in the program editor area 303, the control is shifted to the step 1010.

The step 1010 acquires the module name of the connection target module graphics. In acquiring it, the display ID of the connection target module graphics is compared with the module ID stored in the edition module ID 902 of the record 901 of the program display table. The module name stored in the module name 903 is acquired from the record 901 of the program display table for which the display ID 902 and the edition module display ID match. The acquired module name is used as the connection target module name.

In a step 1011, since there is not the connection target module graphics in the movement target of the connection source module graphics, the connection source module graphics is processed as the movement of the display position. In the present embodiment, detailed description of the step 1011 is omitted.

A step 1012 retrieves the navigate program for generating the connector in accordance with the connection source module name and the connection target module name. The step 1012 is explained in detail with reference to the drawing.

Figure 12:
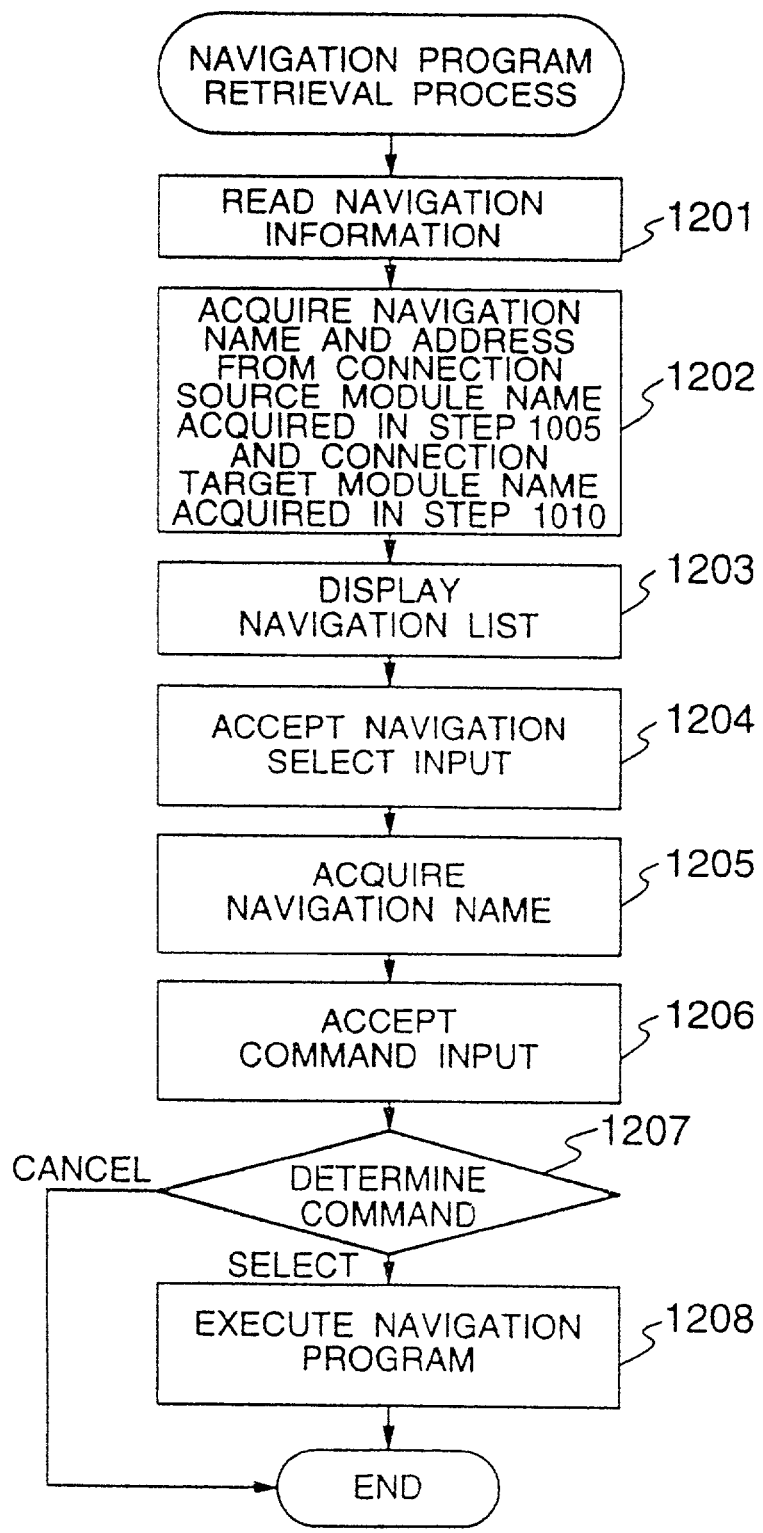
FIG. 12 shows a process flow for retrieving a navigation program.

FIG. 12 shows a detailed flow chart of the step 1012. The step 1012 is a navigation program retrieval step to be executed by the navigator 105. The navigation program retrieval process retrieves a navigation program for generating a connector to connect the connection source module and the connection target module based on the connection source module name acquired in the step 1005 and the connection target module name acquired in the step 1010. FIG. 12 is explained in detail.

Figure 13:
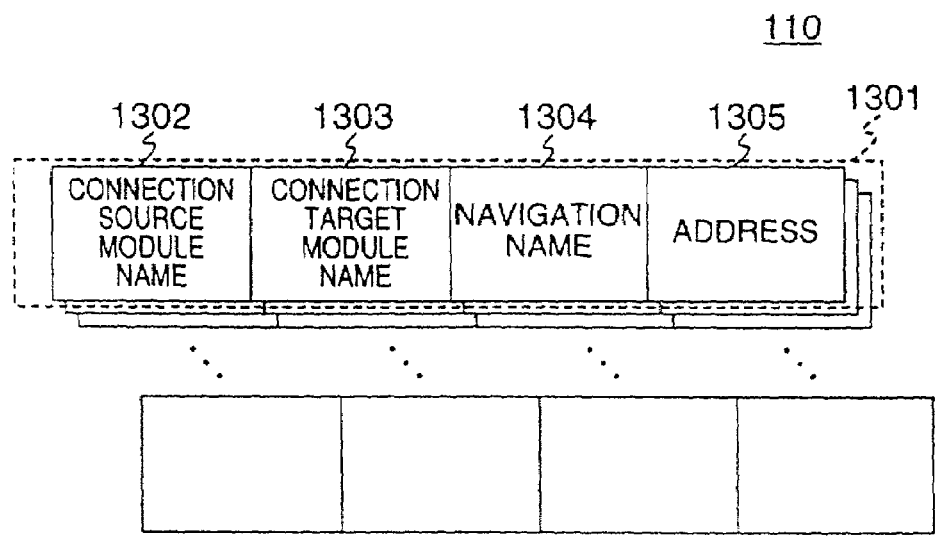
FIG. 13 shows a navigation information table for managing navigation programs, FIG. 14 show a screen of a list of navigation names.

The step 1201 reads the navigation program for generating the connector from the navigation information 110, develops it into the navigation information table accessible by the present system and loads it in the memory. A structure of the navigation information table 110 loaded in the memory is shown in FIG. 13. The navigation information table 110 comprises a plurality of records 1301. Each of the records 1301 includes a connection source module name 1302 for storing a name of connection source module, a connection target module name 1303 for storing a name of connection target module, a navigation name 1303 for storing a name of navigation program for generating the connector for connecting the connection source module and the connection target module and an address 1305 for indicating a location of the navigation program.

A step 1202 compares the connection source module name stored in the connection source module name 1302 of the record 1301 of the navigation information table developed in the memory in the step 1201 with the connection source module name acquired in the step 1005. All records 1301 of the navigation information table for which the connection source module name stored in the connection source module name 1302 and the connection source module name acquired in the step 1005 match are stored.

The connection target module name stored in the connection target module name 1303 of the record 1301 of the stored navigation information table and the connection target module name acquired in the step 1010 are compared. All navigation names stored in the navigation name 1304 of the navigation information table for which the connection target module name stored in the connection target module name 1303 and the connection target module name acquired in the step 1010 match are acquired.

Figure 14:
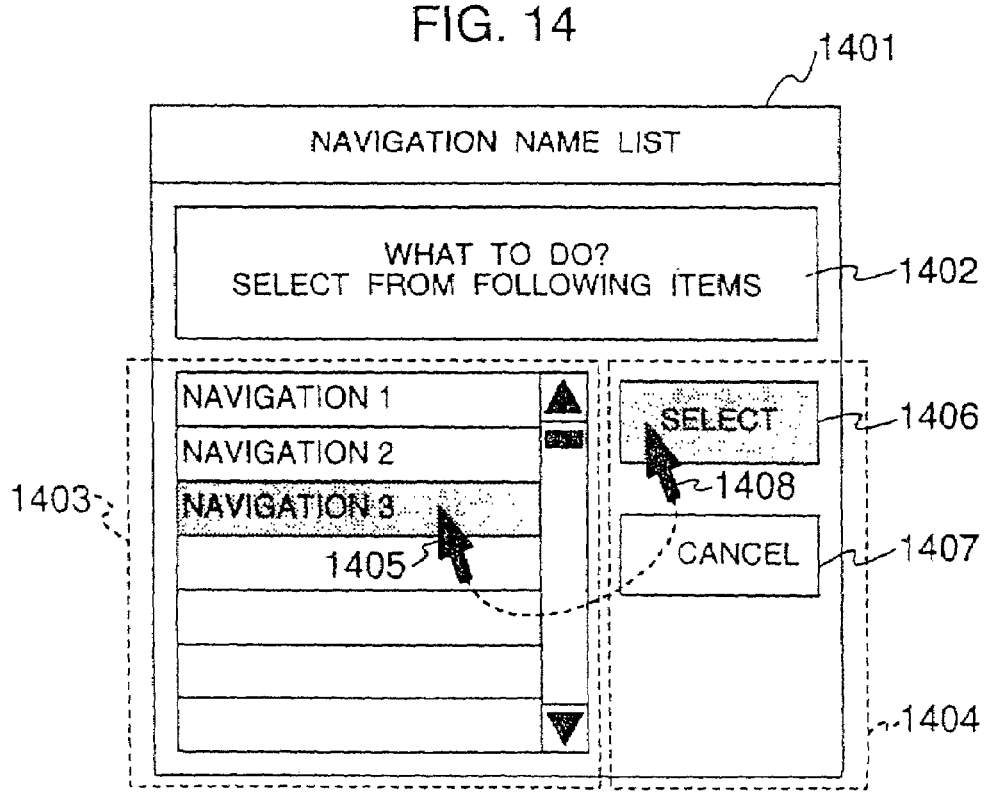

A step 1203 displays a list of the navigation names acquired in the step 1202. FIG. 14 shows an example of screen displaying a list of the navigation names.

A navigation name list screen 1401 comprises a message area 1402 for indicating a guide message from the navigator 105, a navigation name list 1403 for displaying the navigation names acquired in the step 1202, and a group of command buttons 1404 for displaying buttons to select a function of the navigator 105. Two types of buttons, a selection command button 1406 and a cancellation command button 1407, are included. The navigation name list 1403 shows three navigation names as a result of acquisition in the step 1202 as an example.

A step 1204 accepts an input for selecting a navigation name displayed on the navigation name list 1403 in the step 1203. In the selection operation, the navigation name displayed on the navigation name list 1403 is clicked by the mouse. In FIG. 14, the navigation name displayed in the third line is clicked by the mouse (1405).

A step 1205 acquires the navigation name clicked in the step 1204.

A step 1206 accepts an input for selecting a function of the navigator 105 displayed in the command button group 1404. In the selection operation, the button displayed in the command button group is clicked by the mouse. In FIG. 14, the select command button 1406 is clicked by the mouse (1408).

A step 1207 determines the command inputted in the step 1206 based on the position of the mouse cursor. When the select command button 1406 is selected, a control is shifted to a step 1208. When the cancel command button 1407 is inputted, the step 1012 is terminated.

A step 1208 executes the navigation program. The step 1208 will be explained in detail with reference to the drawing.

Figure 15:
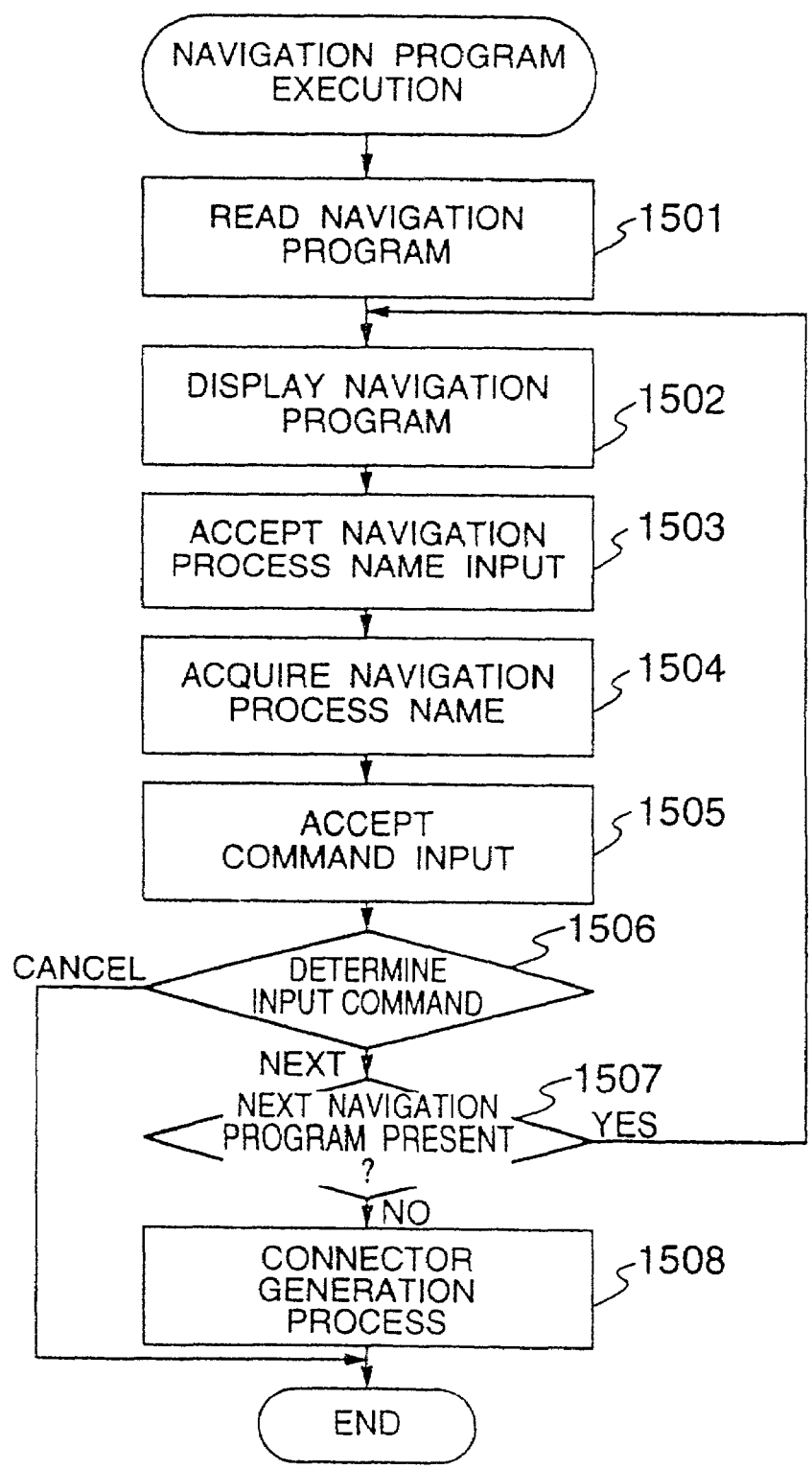
FIG. 15 shows a process flow for executing a navigation program.

FIG. 15 shows a detailed flow of the step 1208. The step 1208 executes the navigation program stored in the navigator 105. FIG. 15 is now explained in detail.

A step 1501 compares the navigation name acquired in the step 1205 with the navigation name stored in the navigation name 1304 of the record 1301 of the navigation information table developed in the memory. The address stored in the address 1305 of the record 1301 of the navigation information table for which the navigation name stored in the navigation name 1304 and the navigation name acquired in the step 1301 match is acquired. The navigation program is read from the acquired address.

Figure 16:
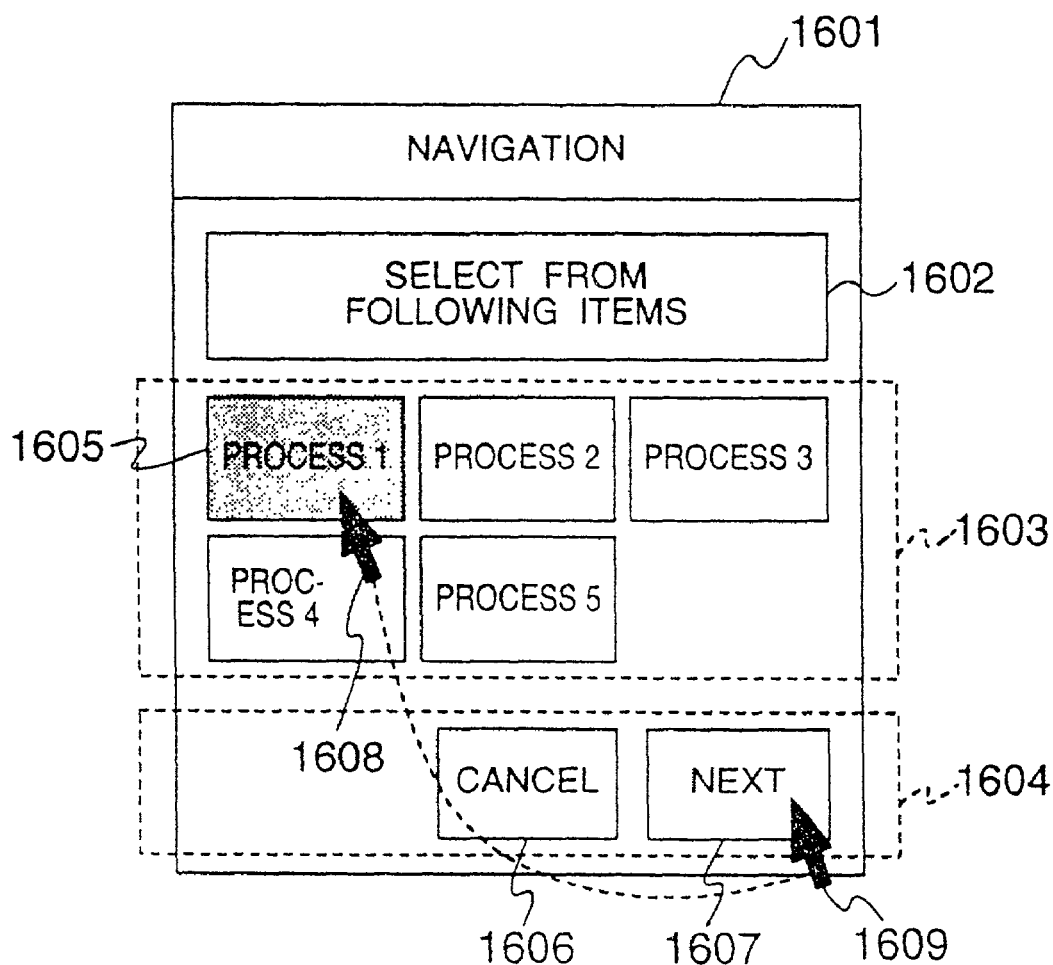
FIG. 16 shows a navigation screen of the present invention.

A step 1502 executes the navigation program read in the step 1501 to display a screen. FIG. 16 shows an example of execution screen of the navigation program.

A navigation program screen 1601 comprises a message area 1602 for displaying the guide massage from the navigation program, a navigation area 1603 for displaying graphics group representing the functions of the navigation program and a command button group 1604 for displaying buttons to guide the navigation. Two type of button, a next command button 1407 for executing the next step and a cancel command button 1406 are included. The navigation area 1603 graphically displays five navigation functions, as an example.

A step 1503 accepts an input for selecting the graphics group displayed in the navigation area 1603 in the step 1501. In the selection operation, any graphics is clicked by the mouse from the graphics group displayed in the navigation area 1603. In FIG. 15, the graphics 1605 designated by "process 1" is clicked by the mouse (1608).

A step 1504 acquires the navigation process name bound by the graphics by clicking the graphics in the step 1503. A structure of the navigation process is shown in FIG. 17A and 17B. The navigation process has a structure as shown by a block 1701. The structure comprises a navigation process type 1702, a process name 1703 and a process content 1704.

The process content 1704 comprises a plurality of statements 1705. An example of the statement 1705 is shown in a block 1706. A statement 1707 is a substitution statement. An example of grammar of the substitution statement is shown in a block 1708. A grammar 1709 connects a left side comprising the module name and a variable connected by a period to value by an equal mark. A block 1710 shows an example of the navigation process bound by the graphics 1605. A step 1503 acquires a navigation name 1711 from the navigation step 1710.

A step 1505 accepts an input for selecting a function of the navigation program displayed in the command button group 1604 in the step 1502. In the selection operation, the button displayed in the command button group is clicked by the mouse. In FIG. 16, the next command button 1607 is clicked by the mouse (1609).

A step 1506 determined the command inputted in the step 1505. When the next command button 1606 is selected, a control is shifted to a step 1507. When the cancel command button 1607 is inputted, the step 1208 is terminated.

A step 1507 shifts the control to the step 1501 if there is a navigation program bound by the next command button 1606, and to a step 1508 if there is not.

The step 1508 generates a connector corresponding to the navigation process name acquired in the step 1504. The step 1508 is explained in detail with reference to the drawing.

Figure 18:
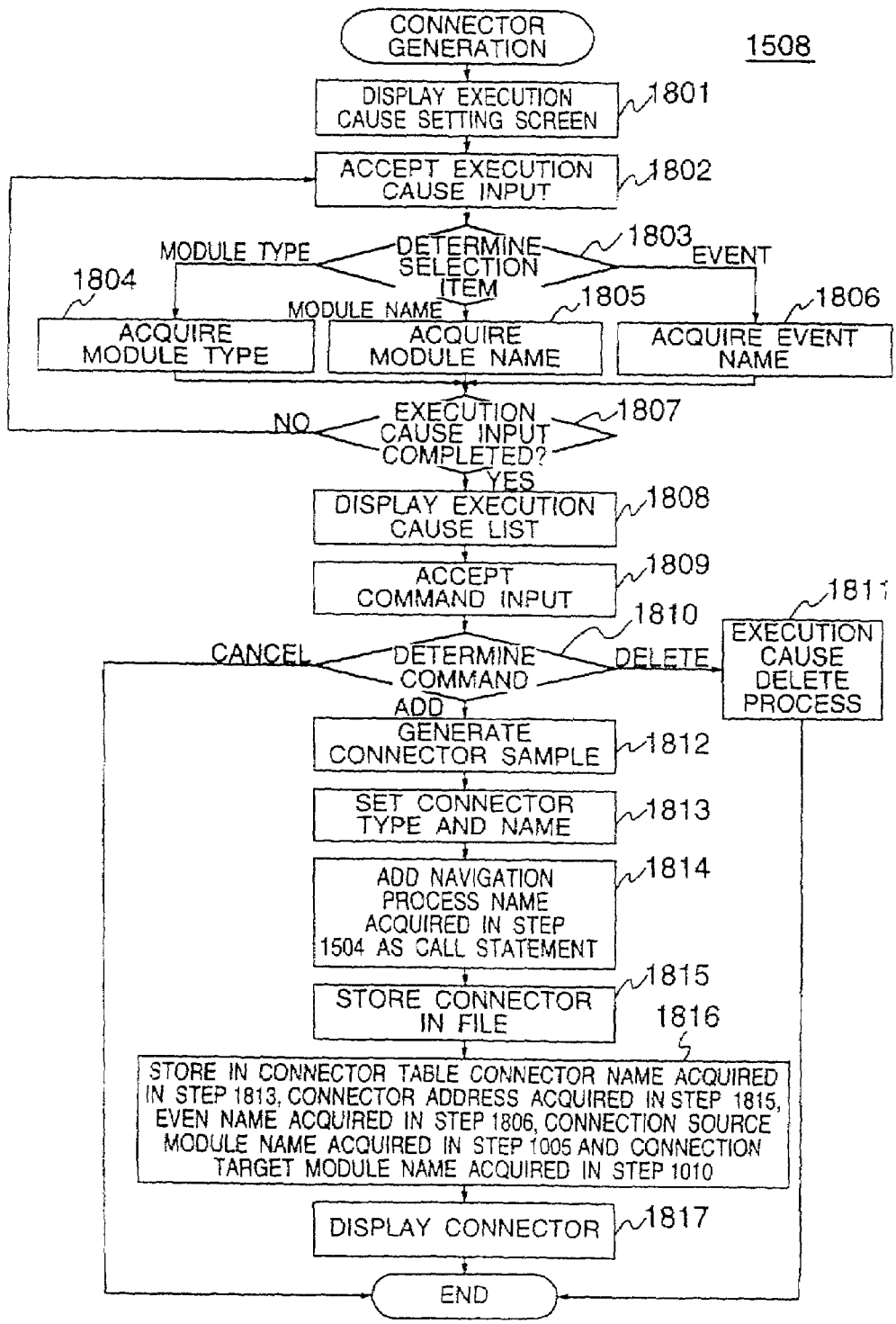
FIG. 18 shows a process flow for generating a connector.

FIG. 18 shows a detailed flow of the step 1508. The step 1508 is a connector generation step. FIG. 18 is explained in detail.

Figure 19:
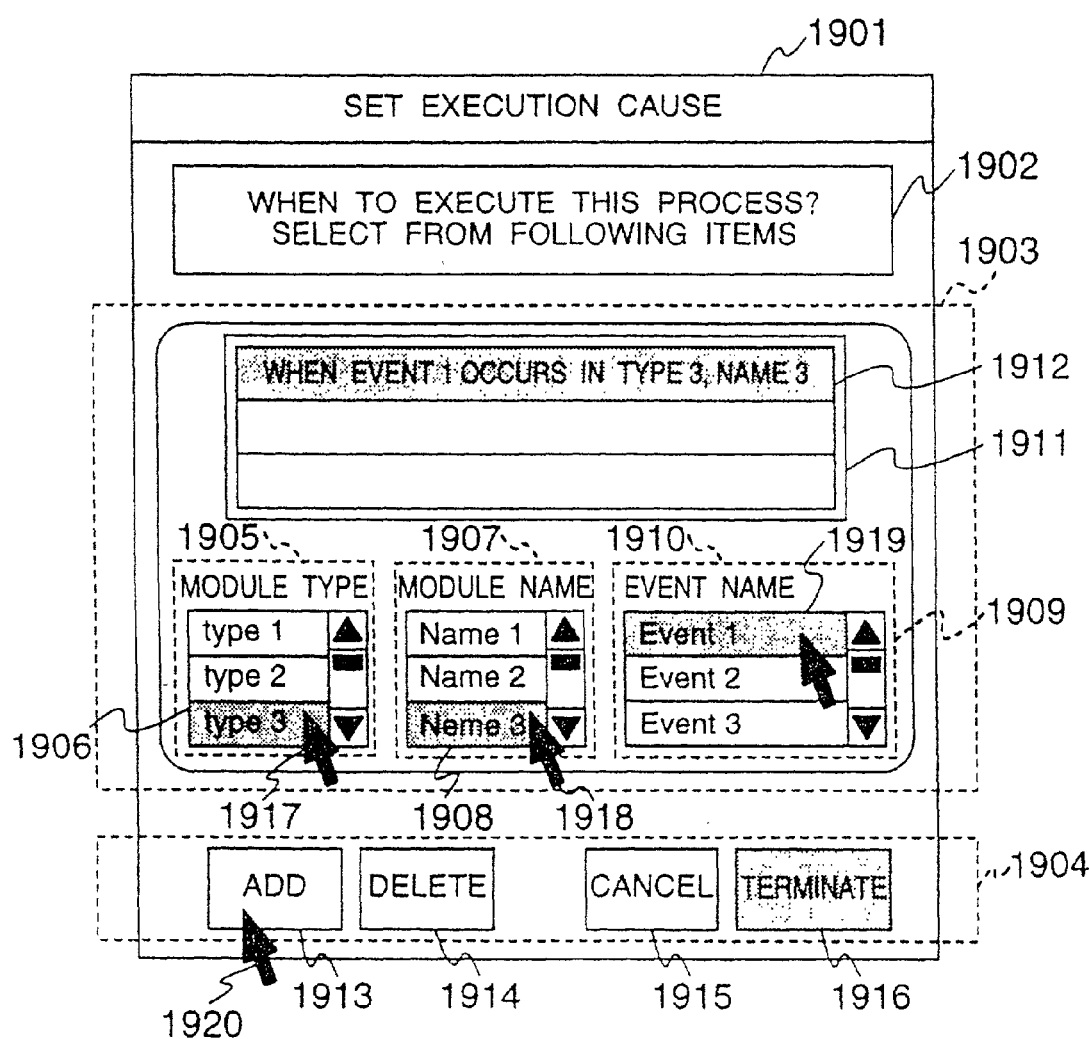
FIG. 19 shows an execution cause setting screen of the present invention.

A step 1801 displays a screen for setting an execution cause of the connector to be generated. FIG. 19 shows an execution cause setting screen.

The execution cause setting screen 1901 comprises a message 1902 for displaying a guide message, an execution cause setting area 1903 for setting the execution cause, and a command button group 1904 for displaying buttons to manipulate the execution cause setting screen 1901. Type of button include an add command button 1913, a delete command button 1914, a cancel command button 1915 and an end command button 1916. The execution cause setting area 1903 displays a module type list 1905, a module name list 1907, an even name list 1909 and an execution cause list 1911. The module type corresponding to the edition module graphics displayed in the program editor area 303 is retrieved from the module type stored in the module type 402 of the record 401 of the module information table and the retrieved module type is displayed in the module type list 1905. The module name corresponding to the edition module graphics displayed in the program editor area 303 having the type mentioned above is retrieved from the module name stored in the module name 403 of the record of the module information table and the retrieved module name is displayed in the module type list 1905. By selecting the module name displayed in the module name list 1907, the event name stored in the event name 414 of the event list pointer 406 of the record 401 of the module information table is displayed in the event name list 1909. By designating a desired type of the module type list 1905, a desired module name of the module name list 1907 and a desired event name of the event name list 1909, the execution cause is displayed in the execution cause list 1911.

A step 1802 accepts an input for selecting the module type list 1905, the module name list 1907 and the event name list 1909 displayed in the execution cause setting area 1903 in the step 1801. In the selection operation, a desired type (1906) of the module type list 1905 is clicked by the mouse (1917) and a desired module name (1908) displayed in the module name list 1907 is clicked by the mouse (1918), and a desired event name (1910) displayed in the event name list 1909 is clicked by the mouse (1919).

A step 1803 determines the selection inputted in the step 1802. When the desired type displayed in the module type list 1905 is clicked by the mouse, a control is shifted to a step 1804, when the desired module name displayed in the module name list 1907 is clicked by the mouse, the control is shifted to a step 1805, and when the desired event name displayed in the event name list 1909 is clicked by the mouse, the control is shifted to a step 1806.

A step 1804 acquires the module type clicked by the mouse in the step 1203.

A step 1805 acquires the module name clicked by the mouse in the step 1203.

A step 1806 acquires the event name clicked by the mouse in the step 1203.

A step 1807 determines whether the input of the module name and the event name which determine the execution cause is over or not. If the input is completed, a control is shifted to a step 1808, and if it is not completed, the control is shifted to the step 1802.

The step 1808 displays the execution cause (1912) in the execution cause list 1911 based on the module type, the module name or the event name acquired in the step 1806.

A step 1809 accepts an input for selecting a function of the execution cause setting screen 1901 displayed in the command button group 1904 in the step 1808. In the selection operation, the button displayed in the command button group is clicked by the mouse. In FIG. 19, the add command button 1916 is clicked by the mouse (1920).

A step 1810 determines the command inputted in t he step 1809. If the add command button 1913 is inputted, a control is shifted to a step 1812 and if the delete command button 1914 is inputted, the control is shifted to a step 1811. When the cancel command button 1915 is inputted, the step 1508 is terminated.

A step 1811 deletes the execution cause displayed in the execution cause list 1911. Detailed description of the step 1811 is omitted.

Figure 20A:
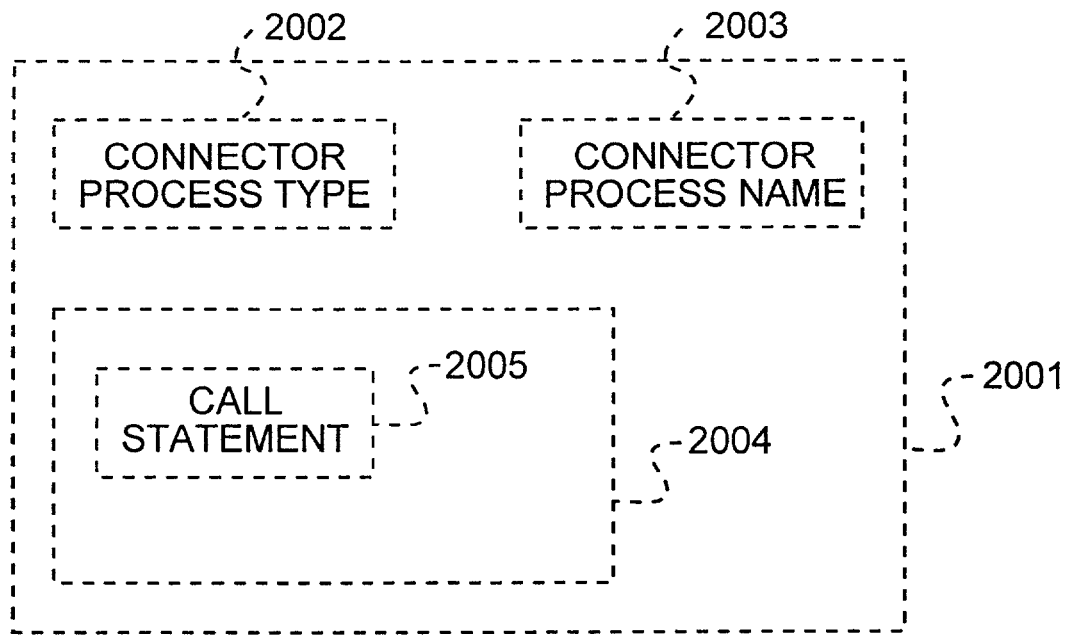
FIGS. 20A and 20B show a structure of a connector.
Figure 20B:
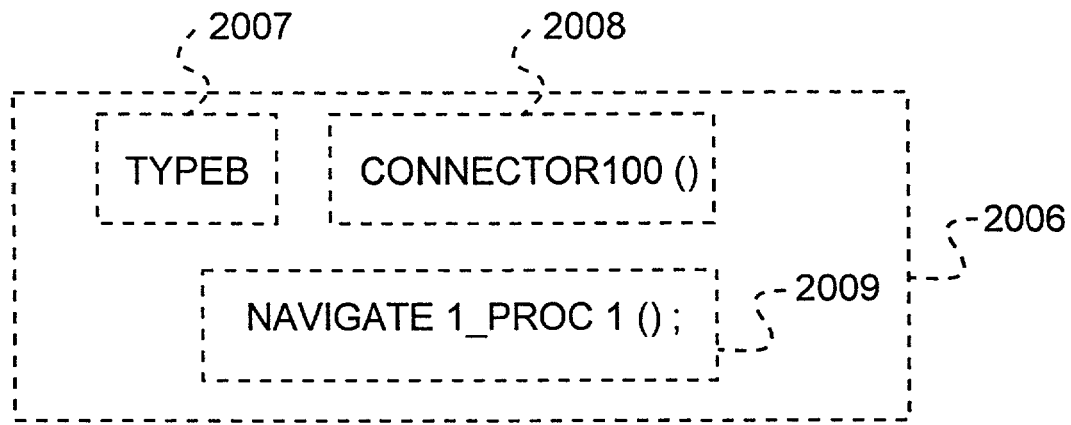

A step 1812 generates a sample of connector to be generated. FIGS. 20A and 20B show a sample of connector.

The sample of connector has a structure shown in a block 2001. The structure comprises a connector type 2002, a connector name 2003 and a connector process content 2004. The connector process content 2004 includes a plurality of call statements 2005.

A step 1813 sets the connector type 2002 and the connector name 2003 generated in the step 1812. An example of setting of the connector type and the connector name in the connector 2006 is shown. Default values are set for the connector type and the connector name. The connector type is "Type B" and the connector name is a character string "Connect" having the number of connectors stored in the connector 112 added thereto as an index. For example, when 99 connectors are already stored, the connector name is "Connect 100" (2008).

A step 1814 adds the navigation process name acquired in the step 1504 as a call statement of the connector process content 2004. A block 2009 has the navigation process name "Navigate Proc1 ( )" acquired in the step 1504 added thereto as the call statement.

A step 1815 stores the connector generated in the steps 1812 to 1814 in the connector 112.

A step 1816 adds the record 709 pointed by the connector list pointer 704 of the record 701 in the program information table developed in the memory in the step 206, stores the connector name generated in the step 1813 in the connector name 710 of the added record, stores the address of the connector 112 stored in the step 1815 in the address 711 of the record 709, stores the event name acquired in the step 1806 in the event 712 of the record 709, stores the connection source module name acquired in the step 1005 in the connection source module 713 of the record 709, and stores the connection target module name acquired in the connection target module 714 of the record 709.

Figure 11B:
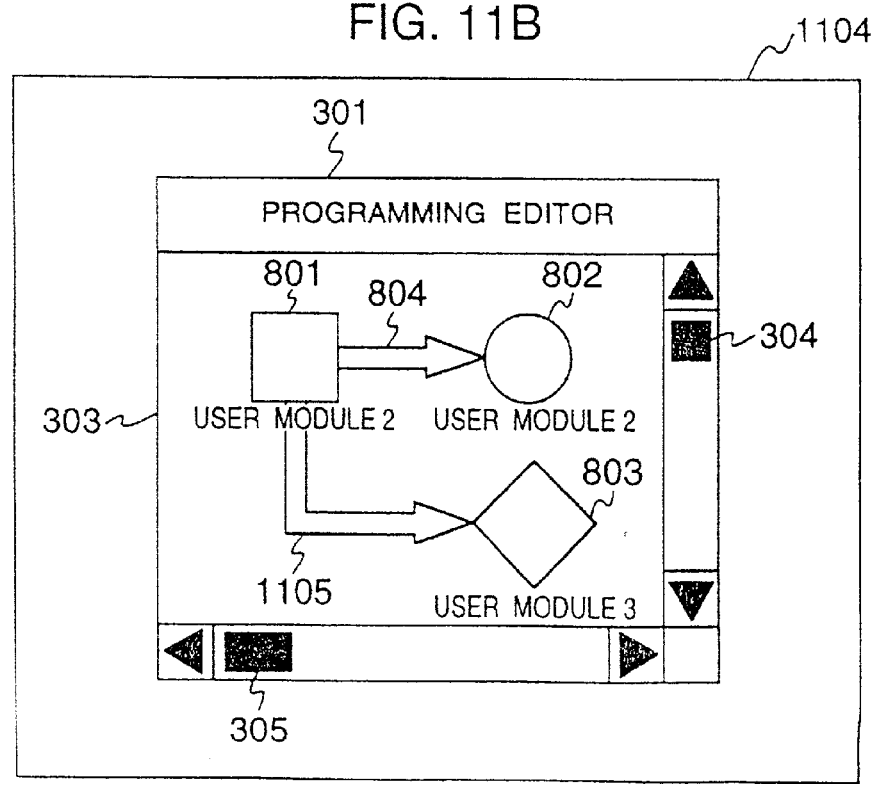

A step 1817 displays the connect graphics in the program editor area 303 between the connection source module graphics and the connection target module graphics. A block 1104 in FIG. 11B shows an example of display. An arrow 1105 indicates the displayed connector graphics.

Figure 21:
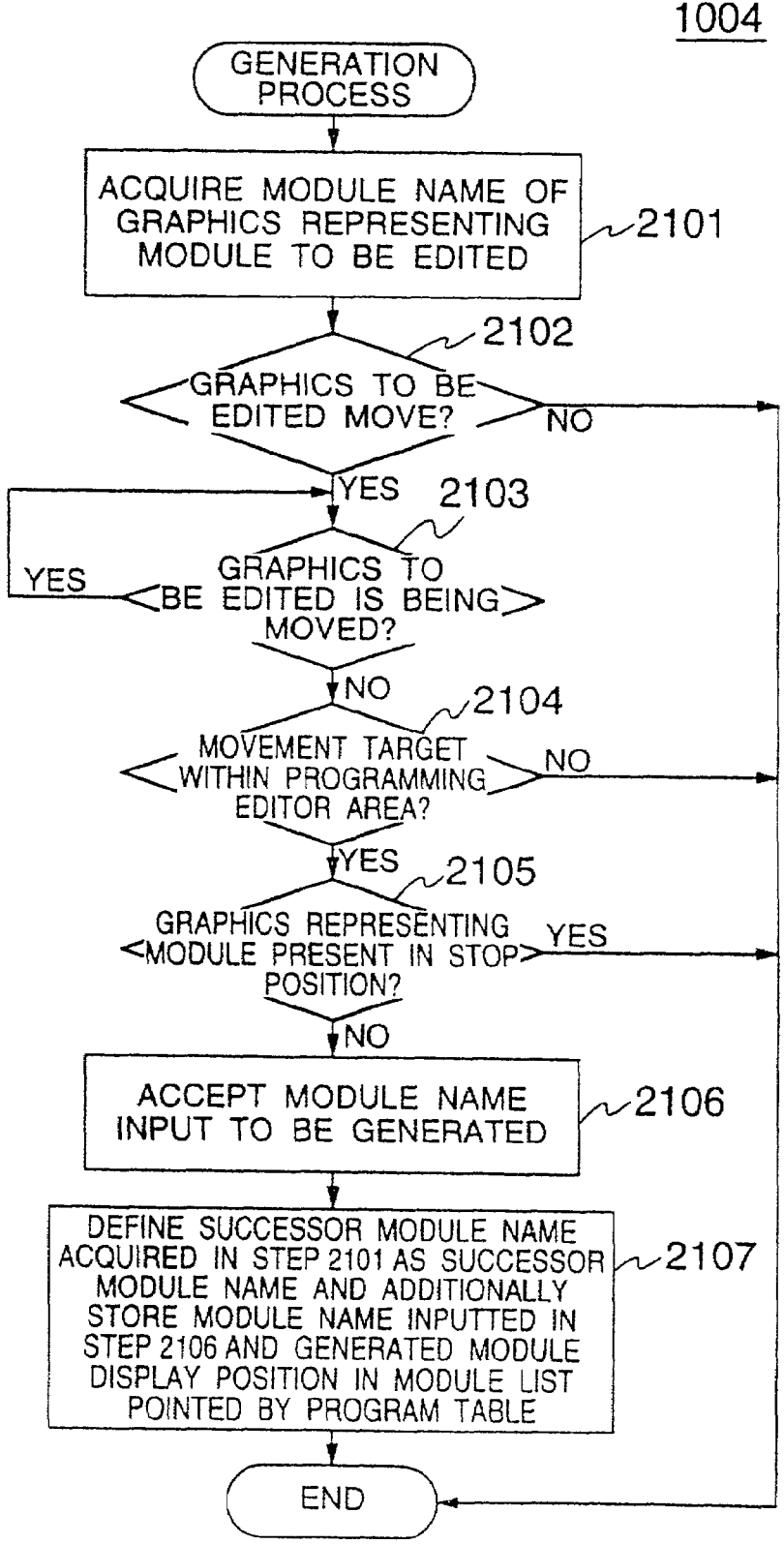
FIG. 21 shows a process flow for generating a module.

The generation step 1004 is explained in detail with reference to FIG. 21.

A step 2101 acquires the module name from the module graphics inputted in the module display area 306. In acquiring the module name, the display ID of the module graphics is compared with the module display ID stored in the module display ID 902 of the record 601 of the module display table. The module name stored in the module name 903 is acquired from the record 601 of the module display table for which the display ID and the module display ID match. The acquired module name is uses as a successor module name.

A step 2102 determines whether the module graphics has been moved or not. If it is only the selection and other module graphics is selected again, the step 1004 is terminated, and if the module graphics is moved, a control is shifted to a step 2103.

The step 2103 determines whether the module graphics is being moved or not. If it is being moved, the step 2103 is repeated. When the movement of the graphics is over, a control is shifted to a step 2104.

The step 2104 determines whether a movement target of the module graphics is within the program editor area 303 or not. If it is within the program editor area 303, a control is shifted to a step 2105, and if it is out of the program editor area 303, the step 1004 is terminated.

The step 2105 determines whether the edition module graphics is displayed in the movement target of the module graphics or not. If the module graphics is not displayed in the movement target, a control is shifted to a step 2106, and if the module graphics is displayed in the movement target, the step 1004 is terminated.

The step 2106 accepts an input of the generated module name.

A step 2107 adds the record 705 pointed by the module list pointer of the record 701 of the program information table, stores the successor module name acquired in the step 2101 in the module name 706 which stores the module name of the added record, stores the successor module name acquired in the step 2101 in the source module name 707 which stores the source module from which the module name is generated, and stores the position of the movement target in the display information 708 displayed in the program editor area 303.

As described above, by operating the module visually displayed on the display device, the navigation program for guiding the combination of modules stored in the memory is retrieved and displayed, and when the desired navigation program is selected from the navigation program group displayed on the display device, the navigation program is executed and the navigation program outputs the parameters for guiding the combination of modules. By designating the parameter, the connector which allows the combination of modules is generated and the generated connector is stored in the memory.

Figure 22:
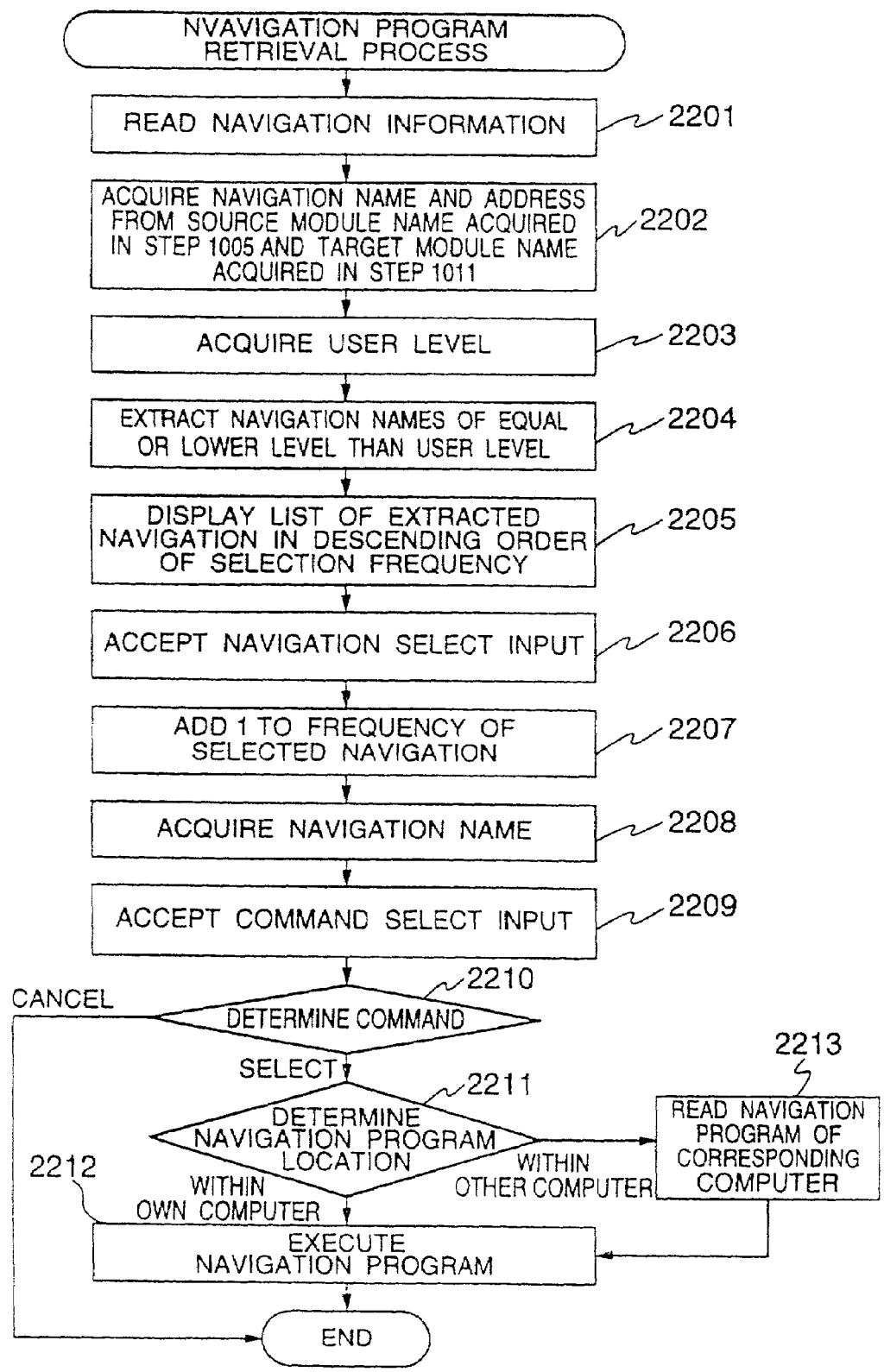
FIG. 22 shows a process flow for retrieving a navigation program.

FIG. 22 shows a process flow of a second embodiment in which the display of the result of retrieval by the retrieval method of the navigation program shown in FIG. 12 and a process when the navigation program is out of its own information processing system are added. The steps explained in FIG. 12 are omitted.

Figure 23:
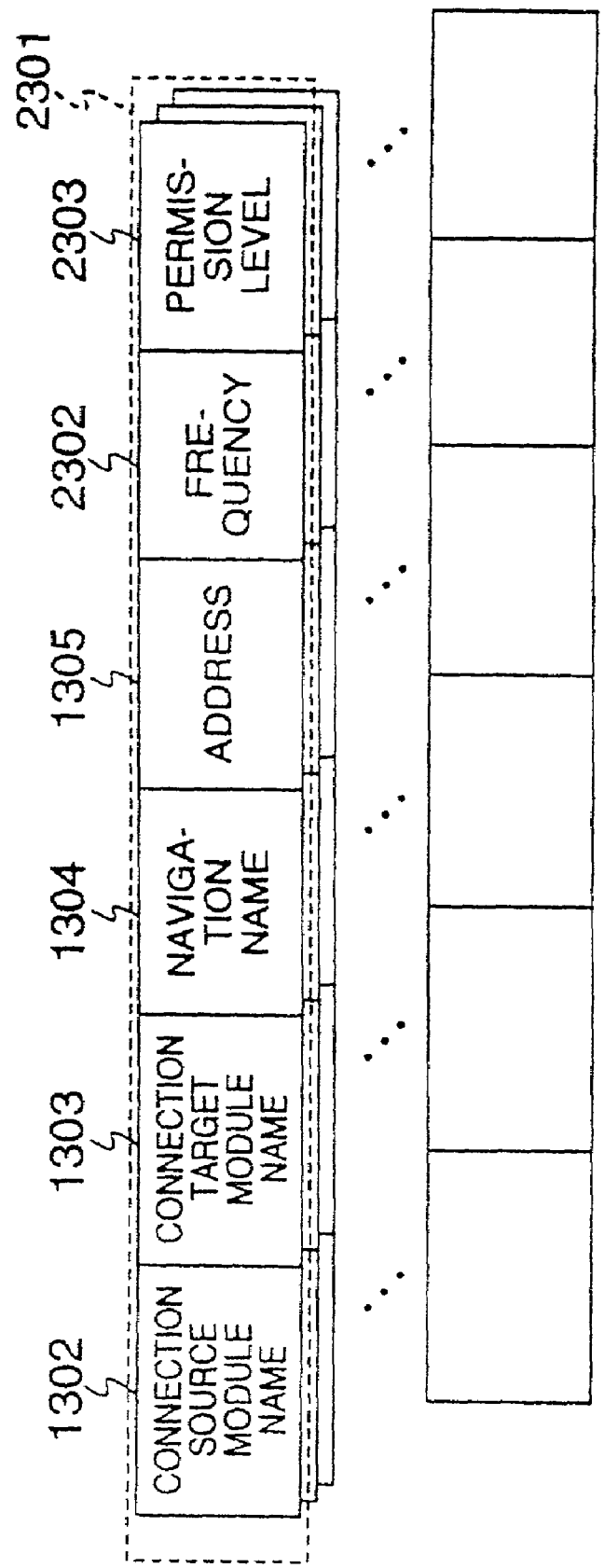
FIG. 23 shows a navigation information table for managing the navigation programs.

A step 2201 reads the navigation program for generating the connector from the navigation information 110, develops it into the navigation information table accessible by the present system, and loads it in the memory. A structure of the navigation information table loaded in the memory is shown in FIG. 23. The navigation information table is an expansion of FIG. 13. The expansion of the navigation information table is explained below. A record 2301 additionally includes a frequency 2302 and a permission level 2303. The frequency 2302 manages the number of times of selection of the record 2301. The permission level 2303 is a flag to limit the execution by the user. The flag may be set in multiple stages.

A step 2202 is same as the step 1202.

A step 2203 acquires the user level used by the present system from the user level 112.

A step 2204 compares the permission level stored in the permission level 2303 of the record 2301 of the navigation information table acquired in the step 2202 with the user level acquired in the step 2203 and acquires the navigation name from the navigation name 1304 of the record 2301 of the navigation information table having the same or lower permission level as or than the user level.

A step 2205 displays a list of the navigation names acquired in the step 2204 in the descending order of the frequency stored in the frequency 2302 of the record 2301 of the navigation information table.

A step 2206 is same as the step 1204.

A step 2207 adds one to the value stored in the frequency 2302 of the record 2301 of the navigation information table corresponding to the navigation name selected in the step 2206.

A step 2208 is same as the step 1205.
A step 2209 is same as the step 1206.
A step 2210 is same as the step 1207.

A step 2211 determines the address stored in the address 1305 of the record 2301 of the navigation information table corresponding to the navigation name selected in the step 2206. If the address is on the other information processing system, a control is shifted to a step 2213, and if it is on its own information processing system, the control is shifted to a step 2212.

A step 2212 is same as the step 1208.

A step 2213 reads the navigation program into the corresponding information processing system in accordance with the address.

As described above, the navigation program stored in the memory is retrieved by the authorization of the user and the retrieved navigation programs are displayed on the display device in the order of frequency of selection. The navigation program stored in the memory of other than its own information processing system may be read.

In accordance with the present invention, by operating the program modules visually displayed on the display device, the navigation program for guiding the combination of program modules stored in the memory is retrieved and displayed. By selecting the desired navigation program from the navigation program group displayed on the display device, the navigation program is executed to output the parameters for guiding the combination of program modules. By designating the parameter, the connect program module which allows the combination of program modules is generated. The generated connect program module may be stored in the memory. In the second embodiment, the navigation program stored in the memory of other than its own information processing system may be executed. In the second embodiment, the retrieval of the navigation program stored in the memory is conducted by the authorization of the user and the retrieved navigation programs are displayed on the display device in the descending order of selection frequency.

What is claimed is:

1. A program generation method for generating a program by combining a plurality of programs in an information processing apparatus having a storage storing a plurality of programs, a navigation program and a display, comprising the steps of:
    (a) specifying a navigation program for displaying information regarding combination of the plurality of programs; and
    (b) generating a connector program for combining said plurality of programs based on a parameter outputted from said navigation program,
    whereby said plurality of programs are combined and executed on said information processing apparatus by executing said connector program.

2. The program generation method according to claim 1, further comprising a step of inputting a navigation program stored in a storage of another information processing apparatus by operating said plurality of programs in response to an instruction inputted to said information processing apparatus.

3. The program generation method according to claim 1, wherein said specifying step is made in accordance with authorization of a user.

4. The program generation method according to claim 1, further comprising a step of displaying a plurality of said navigation programs on said display in a descending order of selection frequency.

5. A program generation system for generating a program by combining a plurality of programs, comprising:
    (a) a storage storing the plurality of programs and a navigation program;
    (b) a display;
    (c) means for specifying a navigation program for displaying information regarding combination of the plurality of programs; and
    (d) means for generating a connector program for combining said plurality of programs based on a parameter outputted from said navigation program,
    whereby said plurality of programs are combined and executed on a first information processing apparatus by executing said connector program.

6. The program generation system according to claim 5, further comprising means for inputting a navigation program stored in a storage of a second information processing apparatus by operating said plurality of programs in response to an instruction inputted to said first information processing apparatus.

7. The program generation system according to claim 5, wherein said specifying means specifies said navigation program in accordance with authorization of a user.

8. The program generation system according to claim 5, wherein a plurality of said navigation programs are displayed on said display in a descending order of selection frequency.

9. A program generation program for generating a program by combining a plurality of programs in an information processing system having a a memory storing the plurality of programs and a navigation program, and a display, comprising the steps of:
    (a) specifying a navigation program for displaying information regarding combination of the plurality of programs; and
    (b) generating a connector program for combining said plurality of programs based on a parameter outputted from said navigation program,
    whereby said plurality of programs are combined and executed on said information processing apparatus by executing said connector program.

10. A memory containing a program generation program for generating a program by combining a plurality of programs in an information processing apparatus having a storage storing the plurality of programs, a navigation program and a display, said program generation program comprising the steps of:
    (a) specifying a navigation program for displaying information regarding combination of the plurality of programs; and
    (b) generating a connector program for combining said plurality of programs based on a parameter outputted from said navigation program,
    whereby said plurality of programs are combined and executed on said information processing apparatus by executing said connector program.

11. A program generation method for generating a program by combining a plurality of programs in an information processing apparatus having a storage storing the plurality of programs, a navigation program and a display, comprising the step of:
    generating a connector program for combining said plurality of programs based on a parameter outputted from said navigation program for managing combination information for combining said plurality of programs,
    whereby said plurality of programs are combined and executed on said information processing apparatus by executing said connector program.

12. A program generation method for generating a program in an information processing apparatus having a storage storing a plurality of programs and a navigation program wherein a connector program for transmitting among said plurality of programs is generated based on a parameter outputted from said navigation program for managing combination information for combining said plurality of programs wherein execution of said connector program combines and executes said plurality of programs said on information processing apparatus.

13. A program generation method for an information processing apparatus having a storage storing a plurality of first programs and a second program, wherein a third program for transmitting among said plurality of first programs is generated based on a parameter outputted from said second program for managing transmission procedure information among said plurality of programs to combine and execute said plurality of first programs on said information processing apparatus by execution of said third program.

* * * * *